(12) United States Patent
Stein

(10) Patent No.: US 8,636,906 B2
(45) Date of Patent: Jan. 28, 2014

(54) LIQUID PURIFICATION USING MAGNETIC NANOPARTICLES

(75) Inventor: Adam L. Stein, Venice, CA (US)

(73) Assignee: Advantageous Systems, LLC, Pasadena, CA (US)

(*) Notice: Subject to any disclaimer, the term of this patent is extended or adjusted under 35 U.S.C. 154(b) by 0 days.

(21) Appl. No.: 13/093,315

(22) Filed: Apr. 25, 2011

(65) Prior Publication Data

US 2012/0018382 A1    Jan. 26, 2012

Related U.S. Application Data

(63) Continuation of application No. PCT/US2009/062184, filed on Oct. 27, 2009.

(60) Provisional application No. 61/271,158, filed on Jul. 20, 2009, provisional application No. 61/211,008, filed on Mar. 26, 2009, provisional application No. 61/108,821, filed on Oct. 27, 2008.

(51) Int. Cl.
*B03C 1/01* (2006.01)
*C02F 1/48* (2006.01)
*B82Y 99/00* (2011.01)

(52) U.S. Cl.
USPC ............................ 210/683; 210/695; 977/838

(58) Field of Classification Search
USPC ................................... 210/683, 695; 977/838
See application file for complete search history.

(56) References Cited

U.S. PATENT DOCUMENTS

| | | | | |
|---|---|---|---|---|
| 3,803,033 A | * | 4/1974 | Sutherland | ..................... 210/673 |
| 5,230,805 A | * | 7/1993 | Yates et al. | ..................... 210/661 |
| 2006/0286379 A1 | | 12/2006 | Gao | |
| 2006/0286563 A1 | | 12/2006 | Lin et al. | |
| 2007/0224705 A1 | | 9/2007 | Hirai et al. | |

FOREIGN PATENT DOCUMENTS

WO     WO 2008055371 A2 * 5/2008 ............... C02F 1/48

OTHER PUBLICATIONS

International Search Report and Written Opinion for corresponding International Application No. PCT/US2009/062184 with mail date of May 24, 2010.

* cited by examiner

*Primary Examiner* — David A Reifsnyder
(74) *Attorney, Agent, or Firm* — Myers Wolin, LLC

(57) ABSTRACT

Disclosed are magnetic nanoparticles and methods of using magnetic nanoparticles for selectively removing biologics, small molecules, analytes, ions, or other molecules of interest from liquids.

9 Claims, 20 Drawing Sheets

| Material | %Loss | Concentration (ug/L) |
|---|---|---|
| Initial concentration | | 234.6 |
| FeO-PEG 1st Removal | 73 | 64.4 |
| FeO-PEG 2nd Removal | 100 | 0 |

| Material | %Loss | Concentration (ug/L) |
|---|---|---|
| Initial concentration | | 782 |
| FeO-Galactose | 98 | 19.32 |
| FeO 0.2:1 Dex:Gala | 52 | 372.6 |
| FeO 2:1 Dex:Gala | 35 | 506 |
| Bare FeO | 29 | 552 |

Figure 28

LIQUID PURIFICATION USING MAGNETIC NANOPARTICLES

CROSS-REFERENCE TO RELATED APPLICATIONS

This application is a continuation of PCT/US2009/062184 filed on Oct. 27, 2009, claims priority to U.S. Provisional Patent Application No. 61/108,821, filed Oct. 27, 2008, and to U.S. Provisional Patent Application No. 61/211,008, filed Mar. 26, 2009, and to U.S. Provisional Patent Application No. 61/271,158, filed Jul. 20, 2009, the contents of each of which are incorporated herein by reference.

STATEMENT REGARDING FEDERALLY SPONSORED RESEARCH OR DEVELOPMENT

This invention was made with U.S. Government support under Award No. IIP-0930768 awarded by the National Science Foundation. The U.S. Government has certain rights in this invention.

BACKGROUND OF THE INVENTION

1. Field of the Invention

The present invention relates to magnetic nanoparticles and methods of using magnetic nanoparticles for selectively removing biologics, small molecules, analytes, ions, or molecules of interest from liquids.

2. Description of the Related Art

Selenium is a trace element that is needed in small quantities for most human, animal and plant survival; however greater concentrations can have a detrimental effect on living species. Elevated concentrations of selenium have been and continue to be a major problem in regions of the western United States, other areas of the US, and all over the world.

Oxyanions of selenium have been identified as environmental toxins in drainage waters from irrigated agricultural soils that contain selenium. The environmental concern regarding selenium has been attributed to its potential to cause either toxicity or deficiency in humans, animals, and some plants within a very narrow concentration range. It has been observed that concentrations of selenate ($SeO_4^{2-}$) as low as 10 parts per billion in water can cause death and birth deformities in waterfowls. As a result, the United States Environmental Protection Agency (U.S. EPA) designated 0.01 mg/L Se as the primary drinking-water standard. Selenate is found in high concentration in areas of the western United States and irrigation activity can result in the movement of selenate to ground or surface waters Irrigation and drainage from selenium rich soils leach selenium into the water of both groundwater and surface water. Aqueous selenium exists predominantly as selenate ($SeO_4^{2-}$) and selenite ($SeO_3^{2-}$). Of the two species, selenate is the more stable in aqueous solutions and thus relatively more difficult to remove. The concentration and the chemical forms of selenium in soils or in drainage waters are governed by various physiochemical factors including oxidation reduction status, pH, and sorbing surfaces.

Selenium can exist inter alia as selenide, elemental selenium, selenite, selenate, and selenium complexes with cyanite or organic bases. At present, physicochemical methods such as chemical precipitation, catalytic reduction, and ion-exchange are mainly utilized for removing Se from wastewater. Of these species, ion exchange favors selenocyanate over selenate and selenate over selenite, whereas the iron hydroxide adsorption has no affinity for selenocyanate and favors selenite over selenate. Since most refinery final effluents and natural waters include a mixture of selenate and selenite selenium species, it has been difficult to approach complete removal of selenium from refinery effluents or natural water using only one step. Furthermore, oxidation to, or reduction from, the selenate state is kinetically very slow which further inhibits optimization. Ion exchange also has not been a successful removal technique because selenate shows almost identical resin affinity as sulfate, which is usually present in a concentration of several orders of magnitude higher than selenate. Thus, the sulfate simply preferentially competes with selenium for resin sites. Furthermore, ion exchange resins become fouled when used to treat selenium wastewater and methods for regeneration are often inadequate and unpredictable.

It is known that microbial reduction of selenate ($Se^{6+}$) into elemental selenium)($Se^0$) via selenite Satoshi Soda ($Se^{4+}$) plays an important role in detoxification of soluble Se in the natural environment. Since elemental Se is of little or no toxicity and is easily removed from the aqueous phase due to its insoluble characteristics, this reductive process might be applied to develop wastewater treatment systems for detoxification and removal of soluble Se, especially selenate.

Current methods of water treatment are not highly effective for scale-up use, are energy intensive, and are associated with high cost. Previous attempted technologies for selenium remediation from water sources include biological processes (anaerobic-bacterial process, facultative-bacterial process, microalgal-bacterial process, and others), microbial volatilization, geochemical immobilization, heavy metal adsorption process, ferrous hydroxide process, membrane processes (reverse osmosis, forward osmosis), ion exchange columns, and other methods. Due to the lack of effectiveness few of the current technologies are implemented in the field, and large evaporation pools or land retirement has been the customary method of dealing with selenium problems in agricultural areas such as the San Joaquin Valley of CA.

Current methods of water treatment are energy intensive and use membrane technology or other complicated water treatment apparatuses. The present invention simplifies water treatment techniques and offers an efficient method of selenium remediation using less energy than other proposed technologies for water treatment while also limiting environmental impact from brine and other harmful bi-products. The present invention is cost effective and has a large positive environmental impact. This novel invention is an element, ion, or molecule specific, safe, repeatable, and cost effective means of selenium removal that is robust and uses minimal electricity as well as minimal environmental impact.

Desalination refers to any of several processes that remove salt and other minerals from water. Water is desalinated to convert it to potable fresh water. Most of the modern interest in desalination is focused on developing cost-effective ways of providing fresh water for human use in regions where the availability of fresh water is limited.

According to a Jan. 17, 2008, article in the Wall Street Journal world-wide, 13,080 desalination plants produce more than 12 billion gallons of water a day. Large-scale desalination typically uses extremely large amounts of energy as well as specialized, expensive infrastructure. A number of factors determine the capital and operating costs for desalination: capacity and type of facility, location, feed water, labor, energy, financing and concentrate disposal.

Moderately saline waters can be used for irrigation and agriculture purposes where strict standards that apply for drinking-water are not required. However, to-date, the energy required and the high cost of desalinating brackish waters and seawater have been the major constraints on large-scale production of freshwater from saline waters.

The energy & electricity requirements are estimated to be reduced by ~70%, thereby making desalinated water more affordable for most crop irrigation. The cost estimation is based on the fact that the separation is conducted by applied magnetic field gradients from a permanent rare earth magnet, and hence does not require huge electricity consumption demanded by the high pressure feed pumps currently used in desalination processes to operate the process at 40-80 bars. The minimal energy costs involved for desalination using functionalized nanoparticles would be pumping feed water initially to the first stirred tank reactor and the energy required for continuous stirring in each tank.

Approximately 70% of the earth's surface is water covered, the vast majority of which is ocean and is unusable without desalination. Freshwater accounts for less than 3% of the total water on the planet, but most of this is locked in the two polar icecaps. Therefore less than 1% of freshwater is readily accessible for human use. Rising demand for potable and irrigation water is of increasing socio-economic importance worldwide and requires the utilization of sea, brackish and saline bore water for fresh water supply. Increasingly, water scientists and engineers are questioning the viability of the current practice of meeting the water demands for all users according to increasingly stringent standards. High free energy of hydration of highly hydrophilic ions such as sodium, potassium, fluoride, and chloride makes the removal of such ions from aqueous solutions a very difficult separation process.

Membrane based reverse osmosis (RO) separation process has become the standard approach for desalinating water all over the world. The process of desalinating water through reverse osmosis has historically been both capital and energy intensive mainly because of the high pressure (40-80 bars) requirements for permeation of water through RO membranes. Thus, while RO has proven to be a reliable method for desalination of water, its high electricity demands is the major impediment for continuous adoption of the technology for desalinating water. Furthermore, the related significant production of green house gas, moderate recovery rates, as well as bio and colloidal fouling of the membranes are some of the concerns with membrane based separation technology.

An alternative to RO for desalination would be a technology that consumes relatively less energy without compromising the effectiveness of salt removal for a given application.

Membrane processes have developed very quickly, and most new facilities use reverse osmosis technology. Membrane systems typically use less energy than thermal distillation, which has led to a reduction in overall desalination costs over the past decade. Desalination remains energy intensive, however, and future costs will continue to depend on the price of both energy and desalination technology.

A Jan. 17, 2008 article in the Wall Street Journal states, "In November, Connecticut-based Poseidon Resources Corp. won a key regulatory approval to build a $300 million water-desalination plant in Carlsbad, north of San Diego. The facility would be the largest in the Western Hemisphere, producing 50 million gallons [190,000 m$^3$] of drinking water a day, enough to supply about 100,000 homes . . . for $3.06 for 1,000 gallons.

Israel is now desalinating water at an operating cost of US$0.53 per cubic meter. Singapore is desalinating water for US$0.49 per cubic meter. According to an article in Forbes, a San Leandro, Calif. company called Energy Recovery Inc. has been desalinizing water for US$0.46 per cubic meter. "Hydro-Alchemy, Forbes, May 9, 2008."

The unsatisfactory energy costs of existing technologies demonstrate the need for new technologies and have resulted in research into various new desalination technologies. In the past many novel desalination techniques have been researched with varying degrees of success. The U.S. Government is working to develop practical solar desalination.

Research efforts at the Lawrence Livermore National Laboratory indicate that nanotube membranes may prove to be effective for water filtration and may produce a viable water desalination process that would require substantially less energy than reverse osmosis. "Lawrence Livermore National Laboratory Public Affairs (2006-05-18). "Nanotube membranes offer possibility of cheaper desalination". Press release, http://www.11nl.gov/pao/news/news_releases/2006/NR-06-05-06.html"

Siemens Water Technologies had reportedly developed a new technology that desalinizes one cubic meter of water while using only 1.5 kWh of energy, which, according to the report, is one half the energy that other processes use. "Team wins $4 m grant for breakthrough technology in seawater desalination, The Straits Times, Jun. 23, 2008."

A relatively new process, the "Low Temperature Thermal Desalination" (LTTD) uses low pressures inside chambers created by vacuum pumps and the principle that water boils at low pressures, even at ambient temperature.

In another area of water purification, systems currently utilized as a step in the potable water production process in ultrafiltration membranes use polymer membranes with chemically formed microscopic pores that use pressure to drive the water through the filter.

Ion exchange systems use ion exchange resin- or zeolite packed columns to replace unwanted ions commonly to remove $Ca^{2+}$ and $Mg^{2+}$ ions and replacing them with benign (soap friendly) $Na^+$ or $K^+$ ions. Ion exchange resins also used to remove toxic ions such as nitrate, nitrite, lead, mercury, and arsenic.

Disinfection is currently accomplished both by filtering out harmful microbes and also by adding disinfectant chemicals In the last step in purifying drinking water, water is disinfected to kill any pathogens which pass through the filters. Common pathogens include viruses, bacteria, such as *Escherichia coli*, *Campylobacter* and *Shigella*, and protozoans, including *Giardia lamblia* and other cryptosporidia.

In areas with naturally acidic waters the water may be capable of dissolving lead from any lead pipes that it is carried in. small quantities of phosphate ion are added and the pH is slightly increased. Both assist in greatly reducing lead ions by creating insoluble lead salts on the inner surfaces of the pipes.

Some groundwater sources contain radium. Typical sources include many groundwater sources north of the Illinois River in Illinois. Radium is commonly removed by ion exchange, or by water conditioning.

Although fluoride is added to water in many areas, some areas such as parts of Florida have excessive levels of natural fluoride in the source water. Excessive levels can be toxic or cause undesirable cosmetic effects such as staining of teeth. One method of reducing fluoride levels is through treatment with activated alumina.

BRIEF SUMMARY OF THE INVENTION

The present invention relates to magnetic nanoparticles and methods of using magnetic nanoparticles for selectively removing biologics, small molecules, analytes, cations, anions, ions, or molecules of interest from liquids.

The nanoparticles are preferably synthetically produced analogues of magnetic minerals found throughout the world.

The minerals and their analogues can exhibit various magnetic properties, including but not limited to diamagnetic, paramagnetic, superparamagnetic, ferromagnetic, ferrimagnetic, antiferromagnetic, spin glass, and electromagnetic.

The magnetic nanoparticles are preferably synthetic analogues of any suitable magnetic material or combination of materials, such as magnetite, ulvospinel, hematite, ilmenite, maghemite, jacobsite, trevorite, magnesioferrite, pyrrhotite, greigite, troilite, goethite, lepidocrocite, feroxyhyte, iron, nickel, cobalt, awaruite, wairauite, or any combination thereof.

The magnetic nanoparticles can be of various sizes and shapes.

The magnetic particles may be used alone, or coated or complexed with one or more materials that enhance the selectivity or the affinity of the magnetic nanoparticles to the desired target molecule.

In one disclosed embodiment of the process, the magnetic particles are mixed with the liquid containing the target impurities for a sufficient period for the magnetic particle to form a complex or conjugate with the target.

After the complex or conjugate with the target is formed the liquid is subjected to the influence of an external magnetic field of sufficient strength to cause the nanoparticles to segregate in a portion of the liquid. The liquid portion free of nanoparticles and bound target is separated from the portion of the liquid containing the nanoparticles.

The nanoparticles, complexed or conjugated with the target are regenerated by subjecting it to conditions which result in the release of the target from the nanoparticles.

Where the target itself is a valuable molecule the released target is collected for use of further processing.

The regenerated nanoparticles are suitable for reuse in the above described process.

In one embodiment of this disclosure, novel functionalized magnetic nanostructured materials (NM) are synthesized for removal of various salt ions of salinated water for agricultural as well as potable purposes.

The nanoparticles are mixed with the saline water in various steps that permits selective binding of dissolved salt ions to the functionalized particles. Under low magnetic fields (~1 T), the salt bound particles are attracted and separated by using magnets, preferably permanent rare earth magnets.

The process is repeated a few times until the desired salt concentration in the product water is reached. The functionalized nanoparticles are reused by eluting the bound salts from the particles with water or other specific reagents. Most importantly, the process is scalable by the application of linearly scalable continuous stirred tank reactors with water flow under gravitation or by a single tank process as hereinafter disclosed.

In certain embodiments the binding molecules will be selective for analytes, cations, anions, ions, and/or molecules in liquids.

The present invention relates to magnetic nanoparticles and methods of using magnetic nanoparticles for selectively removing biologics, small molecules, analytes, cations, anions, ions, or molecules of interest from liquids.

In certain embodiments, the present invention is a method of water treatment where unconjugated or conjugated nanoparticles are mixed with water and analytes, cations, anions, ions, or molecules bind to charged nanoparticles or conjugated binding molecules forming bound-nanoparticle complexes.

In other embodiments, the present invention water treatment process is repeated until analytes, cations, anions, ions, and/or molecules have been selectively separated from water.

In certain embodiments, the present invention selectively removes selenium (in elemental form, selenate, selenite, selenide, ionic forms, oxidated forms, found in organic compounds such as dimethyl selenide, selenomethionine, selenocysteine and methylselenocysteine, and selenium isotopes, and selenium combined with other substances).

The disclosed processes are also useful in water purification systems.

The nanoparticle method produces water with a very low available nutrient level which physical methods of treatment rarely achieve. Very low nutrient levels allow water to be safely sent through distribution system with very low disinfectant levels thereby reducing consumer irritation over offensive levels of chlorine and chlorine by-products.

It is an object of this invention to provide a more effective, efficient process 1) for water desalination; 2) for water purification and 3) for removal of selenium and its compounds.

The magnetic nanoparticles are preferably synthetic analogues of any suitable magnetic material or combination of materials, such as magnetite, ulvospinel, hematite, ilmenite, maghemite, jacobsite, trevorite, magnesioferrite, pyrrhotite, greigite, troilite, goethite, lepidocrocite, feroxyhyte, iron, nickel, cobalt, awaruite, wairauite, or any combination thereof.

Mineral nanoparticles by themselves may have some binding properties due to hydroxyl or other surface groups but do not have sufficient functionality to be operable in the disclosed processes. Functionality is achieved by actively changing the surface groups either by maximizing the number of charged groups on the surface of the nanoparticles or by coating with a polymer or other material to obtain a surface functionalized by carboxyl, amine, or other reactive groups. Separation processes involving surface functionalized nanoparticles without receptors are preferred for the separation of certain cations or anions.

In certain embodiments, the present invention selectively removes biologics, small molecules, analytes, cations, anions, ions, or molecules of interest from water.

In other embodiments, the present invention selectively removes biologics, small molecules, analytes, cations, anions, ions, or molecules of interest to leave potable water.

In certain embodiments, the present invention relates to the synthesis of magnetic nanoparticles or other magnetic nanomaterials surface functionalized with a given surface charge or conjugated to binding molecules such as receptors.

In certain embodiments, the present invention water treatment process is repeated until analytes, cations, anions, ions, and/or molecules have been selectively separated from water.

In certain embodiments, the present invention selectively removes selenium (in elemental form, selenate, selenite, selenide, ionic forms, oxidated forms, found in organic compounds such as dimethyl selenide, selenomethionine, selenocysteine and methylselenocysteine, and selenium isotopes, and selenium combined with other substances).

BRIEF DESCRIPTION OF THE DRAWINGS

FIG. 28. Table showing concentration differences and percentage of selenate removal. Samples were pure deionized water with sodium selenate salt solution of initial concentration of 234.6 μg/L and 782 μg/L respectively and all samples used 15 mg (+/−3 mg) of nanoparticulate material in 5 mL of selenate solution.

DETAILED DESCRIPTION OF THE INVENTION

Figure 1:
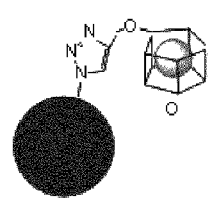
FIG. 1. Example of nanoparticle functionalized to binding molecule receptor selective for analyte, ion, or molecule.
Figure 2:
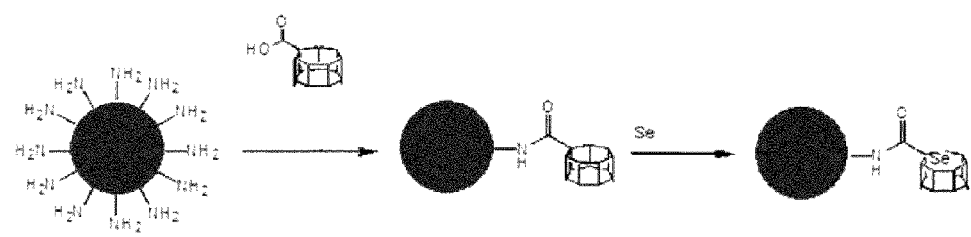
FIG. 2. Example of nanoparticle functionalized to binding molecule receptor selective for analyte, ion, or molecule FIG. 3. Schematic of magnetic nanoparticle with amine functionalization cross-linked to COOH-PEG-OH of various length spacer (x).
Figure 3:
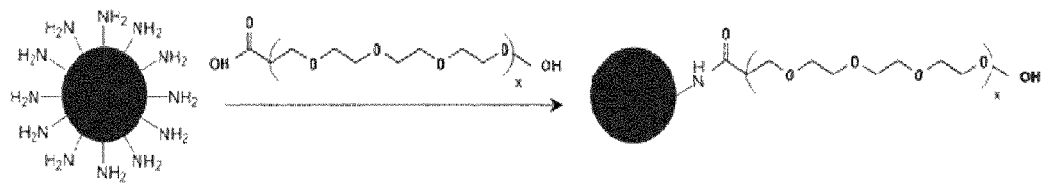
Figure 4:
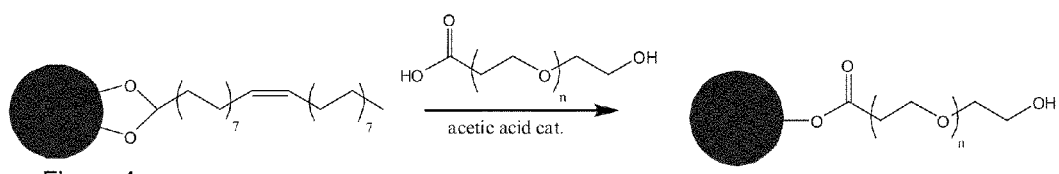
FIG. 4. Schematic of magnetic nanoparticles with oleic acid surfactant exchanged for PEG-OH surfactant for selenate adsorption.

Nanotechnology combined with magnetic separations has already drawn tremendous attention in areas as diverse as biosensors, magnetic targeted drug delivery, novel diagnostic devices, cell separations, as well as other health related applications.

Iron containing nanoparticles are the preferred magnetic nanomaterial for such applications as they are non-toxic and have already been approved by the U.S. Food and Drug Administration as a contrast MRI agent. Central to the success of magnetic nanoparticles, is the maneuverability of magnetic nanoparticles by applying magnetic fields that overcome opposing forces such as Brownian motions, viscous drag & sedimentation.

Magnetic nanoparticles can be conjugated to biological receptors that are selective for specific molecules that have immunological interaction with cells/tissues/serum/proteins as disclosed in copending published US Patent Application Pub. No. 2009/024019 A1, U.S. Ser. No. 12/175,147, incorporated herein by reference and made a part hereof.

Nano-scaled approaches can be used for removing specific contaminants from wastewater. Recent advancements in nanoparticle technology have found that arsenic can be effectively and economically removed under low magnetic fields when adsorbed onto iron oxide nanoparticles. H. D' Couto, Development of a low-cost Sustainable water filter: A study of the removal of water pollutants As (V) and Pb (II) using magnetite nanoparticles, Journ. Of the US SJWP (2008), vol. 1, pg. 32-47, incorporated herein and made a part of this disclosure.

In one of its embodiments, this disclosure relates to a novel nano-functionalized material comprising superparamagnetic iron oxide nanoparticles conjugated to state-of-the-art synthesized ion receptors with high binding specificity for sodium and chloride ions. The resulting nano-functionalized material will be capable of binding sodium chloride when mixed with saline water. Once bound to sodium chloride the functionalized nanoparticles may be pulled out of solution by means of an external magnetic field resulting in desalinated water without high energy costs or environmental detriment.

In another of its embodiments, this disclosure relates to a novel nano-functionalized material comprising superparamagnetic iron oxide nanoparticles surface functionalized with surfactant with high binding specificity for selenate ions. The resulting nano-functionalized material will be capable of binding selenate when mixed with contaminated water. Once bound to selenate the functionalized nanoparticles may be pulled out of solution by means of an external magnetic field resulting in purified water without high energy costs or environmental detriment.

In one of its embodiments, this disclosure relates to a novel nano-material comprising superparamagnetic iron oxide nanoparticles that have a high surface ratio that are monodispersed and have no surfactants with high binding specificity for selenate ions. The resulting nano-functionalized material will be capable of binding selenate when mixed with contaminated water. Once bound to selenate the functionalized nanoparticles may be pulled out of solution by means of an external magnetic field resulting in purified water without high energy costs or environmental detriment.

In one of its embodiments, this disclosure relates to a nano-functionalized material comprising superparamagnetic iron oxide nanoparticles surface functionalized with surfactant with high binding specificity for sodium ions. The resulting nano-functionalized material will be capable of binding sodium when mixed with contaminated water. Once bound to sodium the functionalized nanoparticles may be pulled out of solution by means of an external magnetic field resulting in purified water without high energy costs or environmental detriment.

The present invention also relates to magnetic nanoparticles and methods of using magnetic nanoparticles for selectively removing biologics, small molecules, analytes, cations, anions, ions, or molecules of interest from liquids.

Magnetic nanoparticles useful in the presently disclosed processes can have various magnetic properties, including but not limited to diamagnetic, paramagnetic, superparamagnetic, ferromagnetic, ferrimagnetic, antiferromagnetic, spin glass, and electromagnetic properties.

The magnetic nanoparticles are composed of any suitable magnetic material or combination of materials, such as magnetite, ulvospinel, hematite, ilmenite, maghemite, jacobsite, trevorite, magnesioferrite, pyrrhotite, greigite, troilite, goethite, lepidocrocite, feroxyhyte, iron, nickel, cobalt, awaruite, wairauite, synthetic analogues thereof or any combination thereof.

The magnetic nanoparticles can be of various sizes and shapes.

As used herein "diamagnetism" is the property of an object which causes it to create a magnetic field in opposition of an externally applied magnetic field causing a repulsive effect. The external magnetic field changes the magnetic dipole moment in the direction opposing the external field. Diamagnets are materials with a relative magnetic permeability less than 1. Water, wood, most organic compounds such as petroleum and some plastics, and many metals including copper, mercury, gold and bismuth are diamagnetic.

As used herein "paramagnetism" is a form of magnetism which occurs only in the presence of an externally applied magnetic field. Paramagnetic materials have a relative magnetic permeability of 1 or more. Paramagnets do not retain any magnetization in the absence of an externally applied magnetic field.

As used herein "superparamagnetism" is a form of magnetism which appears in small ferromagnetic or ferrimagnetic nanoparticles. The magnetic susceptibility of such As used herein is much larger than the one of paramagnets. Magnetization randomly flips direction under the influence of temperature. The typical time between two flips is called the Neel relaxation time. In the absence of external magnetic field, their magnetization appears to be on average zero: they are said to be in the superparamagnetic state. In this state, an external magnetic field is able to magnetize the nanoparticles, similarly to a paramagnet.

As used herein "ferromagnetism" is the basic mechanism by which certain materials such as iron form permanent magnets and/or exhibit strong interactions with magnets. All materials that can be magnetized by an external magnetic field and which remain magnetized after the external field is removed are either ferromagnetic or ferrimagnetic.

As used herein a "ferrimagnetic" material is one in which the magnetic moments of the atoms on different sublattices are opposed, the opposing moments are unequal and a spontaneous magnetization remains such as where different materials or ions are present in the sublattices such as $Fe^{2+}$ and $Fe^{3+}$. Examples of ferrimagnetic materials are YIG (yttrium iron garnet) and ferrites composed of iron oxides and other elements such as aluminum, cobalt, nickel, manganese and zinc.

As used herein, "antiferromagnetic" materials are materials where the magnetic moments of atoms or molecules align in a regular pattern with neighboring spins. Generally, antiferromagnetic order may exist at sufficiently low temperatures, vanishing at and above a certain temperature, the Neel temperature. Above the Neel temperature, the material is typically paramagnetic.

As used herein "spin glass" is a magnet with stochastic disorder, where usually ferromagnetic and antiferromagnetic bonds are randomly distributed. Its magnetic ordering resembles the positional ordering of a conventional, chemical glass. Spin glass follows the Curie law in which magnetization is inversely proportional to temperature until T, is reached, at which point the magnetization becomes virtually constant. This is the onset of the spin glass phase.

As used herein "electromagnet" is a material that responds to a changing electrical field by producing an electromagnetic field.

As used herein "rare earth magnets" includes samarium-cobalt magnets and neodymium alloy magnets. Samarium-cobalt magnets, $SmCO_5$, have a higher Curie temperature than neodymium alloy, making these magnets useful in applications where high field strength is needed at high operating temperatures. They are highly resistant to oxidation, but sintered samarium-cobalt magnets are brittle and prone to chipping and cracking and may fracture when subjected to thermal shock. Neodymium alloy ($Nd_2Fe_{14}B$) magnets are the strongest rare-earth magnet. They have the highest magnetic field strength, but are inferior to samarium-cobalt in Curie temperature.

Magnetic Materials Useful as Nanomagnets

As used herein, "spinels" are minerals of general formulation $A^{2+}B_2^{3+}O_4^{2-}$ which crystallize in the cubic (isometric) crystal system, with the oxide anions arranged in a cubic close-packed lattice and the cations A and B occupying some or all of the octahedral and tetrahedral sites in the lattice. A and B can be divalent, trivalent, or quadrivalent cations, including magnesium, zinc, iron, manganese, aluminum, chromium, titanium, and silicon.

As used herein, "Magnetite" is a ferrimagnetic mineral $Fe_3O_4$) one of several iron oxides and a member of the spinel group. The common chemical name is ferrous-ferric oxide. Magnetite's chemical formula is sometimes written as $FeO.Fe_2O_3$, identifying it as one part widstite (FeO) and one part hematite ($Fe_2O_3$). Magnetite is the most magnetic of all the naturally occurring minerals on earth.

As used herein, "Ulvospinel" is an iron titanium oxide mineral ($Fe_2TiO_4$). It belongs to the spinel group of minerals, as does magnetite, ($Fe_3O_4$). Ulvospinel forms as solid solutions with magnetite at high temperatures and reducing conditions.

As used herein, "Hematite" ($Fe_2O_3$) is the reaction product of magnetite and oxygen. Igneous rocks usually contain grains of two solid solutions, one between magnetite and ulvospinel and the other between ilmenite and hematite.

As used herein, "Ilmenite" (crystalline iron titanium oxide, $FeTiO_3$) is weakly magnetic.

As used herein, "Maghemite" ($Fe_2O_3$, y-$Fe_2O_3$) is spinel in structure, the same as magnetite and is also ferrimagnetic. Its character is intermediate between magnetite and hematite.

As used herein, "Jacobsite" is a manganese iron oxide mineral, a magnetite spinel.

As used herein, "Trevorite ($NiFe^{3+}_2O_4$) is a rare nickeliferous mineral belonging to the spinel group.

As used herein, Magnesioferrite is a magnesium iron oxide mineral, a member of the magnetite series of spinels.

As used herein, "Pyrrhotite" is a iron sulfide mineral with a variable iron content: $Fe_{(1,)}S$ (x=0 to 0.2). Pyrrhotite is weakly magnetic.

As used herein, "Greigite" is an iron sulfide mineral with formula: $Fe(II)Fe(III)_2S_4$, also written as $Fe_3S_4$. Every molecule has one $Fe^{2+}$ and two $Fe^{3+}$ ions. It is a magnetic sulfide analogue of the iron oxide magnetite (Fe304).

As used herein, "Troilite" (FeS) is a variety of the iron sulfide mineral pyrrhotite present in meteorites.

As used herein, "Goethite" (FeO(OH)) is an iron oxyhydroxide. Feroxyhyte and Lepidocrocite are polymorphs with the same chemical formula as goethite but with different crystalline structures making them distinct minerals.

As used herein, "Lepidocrocite" (FeO(OH)) is a polymorph of the iron oxyhydroxide.

As used herein, "Feroxyhyte" (FeO(OH)) is a polymorph of the iron oxyhydroxide.

As used herein, "Awaruite" $Ni_3Fe$ is a nickel iron containing mineral.

As used herein, "Wairauite" (CoFe) is an iron cobalt containing mineral.

In addition the magnetic nanoparticles having the composition $CoFe_2O_4$ or $MnFe_2O_4$ or Nickel or Cobalt are also useful. The primary determinants of the choice of specific depends on the ease of synthesis, the strength of its magnetic properties and in some instances the ease of functionalizing its surface and/or the ease of complexing or conjugation to a specific receptor.

Preparation of Nanoparticles

1. Synthesis of Magnetic Nanoparticle

Magnetic nanoparticles of many types are useable in the disclosed processes and may be synthesized by various known means or by the novel methods disclosed herein. Paramagnetic nanoparticles are preferred, superparamagnetic nanoparticles are most preferred.

Superparamagnetic magnetite ($Fe_3O_4$) nanoparticles and superparamagnetic magnetite ($Fe_3O_4$) and/or maghemite (y-$Fe_2O_3$) are preferred species of superparamagnetic nanoparticles.

The nanoparticles can be synthesized using a known thermal decomposition of a metal precursor method, as disclosed in C. Barrera, A. P. Herrera, C. Rinaldi, Colloidal dispersions of monodisperse magnetite nanoparticles modified with poly (ethylene glycol). J Colloid Interface Sci. (2009), vol. 329, pg. 107-113, incorporated herein by reference and made a part hereof, other methods known to a practitioner in the art or by the novel methods disclosed hereinafter.

Thermal decomposition in the presence of a stabilizing ligand as a surfactant and coprecipitation with or without a stabilizing ligand as a surfactant, describe methods of synthesizing superparamagnetic nanoparticles.

The nanoparticles can range in diameter, between about 1 nm and about 500 nm, preferably 1 to 50 nm most preferably 1 to 20 nm.

The nanoparticles, such as superparamagnetic iron oxide nanoparticles, can be produced by high-temperature methods, such as thermal decomposition of a metal precursor in the presence of a stabilizing ligand as a surfactant. Surfactants such as oleic acid and/or oleylamine help prevent agglomeration of the nanoparticles, as well as control growth during synthesis.

Metal precursors include, but are not limited to, carbonyl and acetylacetonate complexes ($Fe(CO)_5$ and $Fe(acac)_3$).

Thermal decomposition reactions may be conducted in inert atmospheres. Subsequent to thermal decomposition, mild oxidation with trimethylamine oxide (($CH_3$)3N0) at elevated temperatures can be performed.

Other synthesis techniques can be used to modify nanoparticle properties as desired, such as, for example, co-precipitation, microemulsion, and hydrothermal synthesis.

Disclosure of a co-precipitation method used can be seen in Example 4. This method can also be used in the presence of a stabilizing ligand surfactant.

A co-precipitation method was used to synthesize superparamagnetic iron oxide nanoparticles whereby a solution of $FeCl_2$ and $FeCl_3$ were mixed in water and added to 1M $NH_4OH$. A black precipitate is formed immediately and the reaction is left to react for 1 hour at room temperature to 37° C. Nanoparticles are decanted on a permanent magnet or centrifugation is used to separate nanoparticles. The nanoparticles are washed 3-5 times with DI water. No stabilizers are used in solution and nanoparticles are bare. Bare magnetic nanoparticles are characterized with DLS and TEM.

Co-precipitation synthesis equation:

$$Fe^{2+}+2Fe^{3+}+8OH^-\rightarrow Fe_3O_4+4H_2O$$

Reaction conditions are selected to produce particles in a size range of from 1 to 500 nm, preferably from 1 to 50 nm, most preferably from 1 to 20 nm.

In alternative embodiments, it is preferred to include other metals such as $Co^{2+}$ or $Mn^{2+}$ to form $CoFe_2O_4$ or $MnFe_2O_4$ superparamagnetic nanoparticles.

In certain embodiments, a mixture of different types and/or sizes of nanoparticles can be used. In this manner different target molecules or different compounds of the same target molecule may be removed from the liquid at the same time.

The nanoparticles are preferably monodispersed after synthesis to facilitate further processing and high surface area to volume ratio. The addition of surfactants that are surface active agents facilitates such dispersion.

2. Surface Functionalization of Nanoparticle

The magnetic nanoparticles may be used as such, or surface functionalized with a coating. The magnetic nanoparticles may be coated to enhance specificity and/or affinity to the specific target.

Dextran, sugars, PEG, PEG-OH, other modified PEG moieties, polyvinyl alcohol, gold, azide, carboxyl groups, activated carbon, zeolites, amine, poly acrylic acid, charged polymers, or others may be used as surface functionalization.

In certain embodiments PEG-OH is used as a surface functionalized coating for adsorption of selenate onto magnetic nanoparticles. PEG-OH serves to adsorb selenate while still maintaining monodispersity of iron oxide nanoparticles allowing for high surface area to volume ratio for greater selenate binding per material used.

In certain embodiments poly acrylic acid is used as a surface functionalized coating for adsorption of sodium onto magnetic nanoparticles. Poly acrylic acid serves to adsorb sodium while still maintaining monodispersity of iron oxide nanoparticles allowing for high surface area to volume ratio for greater sodium binding per material used.

Others have tried to attach poly acrylic acid onto nanoparticles but the instant process uses an interim amine conjugation that Chen et al. did not use.

3. Conjugation of Nanoparticles to Functional Moiety

The magnetic nanoparticles may be used as such, or coated and/or complexed with a target specific receptor. The magnetic nanoparticles may be coated to enhance specificity and/or affinity to the specific target or to promote the ability of the magnetic nanoparticles to complex with the target specific receptor.

The coating/linker may be a polyether. Polyethers are bi- or multifunctional compounds with more than one ether group such as polyethylene glycol and polypropylene glycol. Crown Ethers are other examples of low-molecular polyethers suitable for use in the described processes.

With respect to Na and Cl receptors, macrocycle structures are acceptable.

Polyethylene Glycol (PEG) typically refers to oligomers and polymers with a molecular mass below 20,000 g/mol, polyethylene oxide (PEO) to polymers with a molecular mass above 20,000 g/mol, and POE to a polymer of any molecular mass. Polypropylene glycol's (PPG) secondary hydroxyl groups are less reactive than primary hydroxyl groups in polyethylene glycol but may be used. Polyvinyl alcohol of any molecular mass that have reactive hydroxyl groups may also be used.

Most PEGs are polydisperse; they include molecules with a distribution of molecular weights. The preferred polyether is PEG with an average molecular weight in the range of 400-2400 MW.

Other bi- or multifunctional groups can function as coatings/linkers in the present process.

a) Amine Conjugation

Magnetic nanoparticles may be functionalized with amine groups in the following novel method based on the method disclosed in C. Barrera, A. P. Herrera, C. Rinaldi, Colloidal dispersions of monodisperse magnetite nanoparticles modified with poly(ethylene glycol). J Colloid Interface Sci. (2009), vol. 329, pg. 107-113.

Instead of using mPEG-COOH and reacting it with 3-aminopropyl)-triethoxysilane to form silane-PEG and then reacting that with nanoparticles, the improved process uses silane conjugation and reacted it only with 3-aminopropyl)-triethoxysilane to form amine conjugated nanoparticles ready to react with receptors.

Nanoparticles may also be amine conjugated by reacting with (3-aminopropyl)-triethoxysilane, toluene, and acetic acid with vigorous stirring. The product is decanted and washed with toluene and dried under vacuum.

Magnetic nanoparticles (24 mg) are dissolved in 26 mL toluene. 0.55 mL of (3-aminopropyl)-triethoxysilane is dissolved in 0.5 mL of toluene and added to the particle solution. 3.6 uL of acetic acid is then added and the resulting solution is shaken strongly at room temperature for 72 hours. After 72 hours, the particles are taken off the shaker, and decanted on a permanent magnet. The magnetic nanoparticles are washed with toluene and then dried in dessicator.

Figure 7:
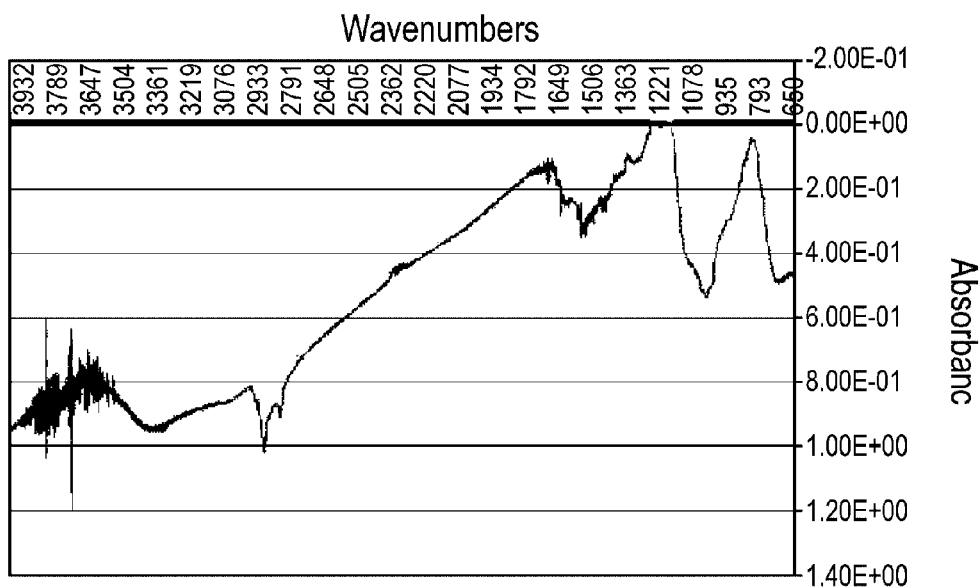
FIG. 7: Fourier transform infrared spectroscopy (FTIR) of amine conjugated superparamagnetic iron oxide nanoparticles FIG. 8. FTIR image of PEG-OH functionalized iron oxide nanoparticles for selenate removal.
Figure 14:
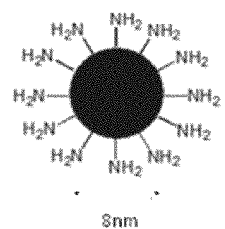
FIG. 14. Amine functionalized nanoparticles.

The above protocol yields an amine conjugated 8 nm magnetic nanoparticles of uniform size, shape, and magnetic properties (see FIGS. 7 and 14 for a schematic description. These figures do not show uniformity but show the presence of amine. Uniformity of size shape and magnetic properties can be seen with the first step nanoparticle syntheses that were used as core before exchanging surface with amines. Those figures are 5,6, and 23). The modified protocol above has been successfully conducted for other conjugation applications.

b) Amide Linked Ion Receptor:

In a specific embodiment related to desalination, the amine functionalized magnetic nanoparticles produced may be cross-linked to synthesized ion receptors that selectively bind to sodium cations and chloride anions. The ion receptors will have an additional functional group such as a carboxylic acid that will bind to the amine group of the magnetic nanoparticles forming a peptide bond.

Other linkers may also be utilized including azide, thiol, ester, etc. The resulting conjugated magnetic nanoparticle is capable of selective binding to ions in an aqueous solution (see FIGS. 1, 2, 13, and 15). Thus, when added to an aqueous solution such as saline water, the ion receptors will bind to ions and an external magnetic field will pull bound-nanoparticle complexes out of solution.

The ion receptors are composed of macrocycle structure containing compounds or crown ethers. The macrocycle is capable of binding to chloride anions and the crown ether will bind to sodium cations. Multiple functional receptors may also be utilized.

Figure 13:
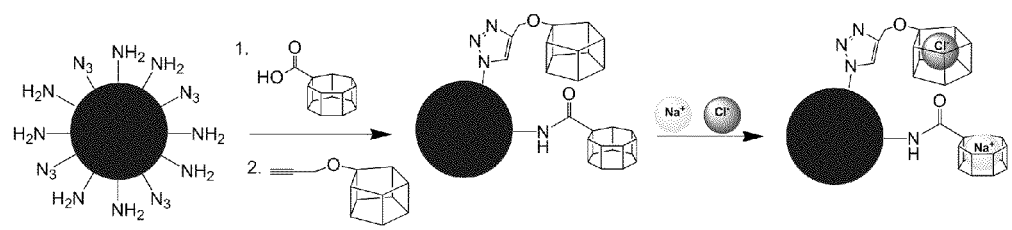
FIG. 13. Conjugation of nanoparticles to individual amide-linked cation receptors capable of binding to sodium ions and triazine-tethered anion receptors capable of binding to Chloride ions.

While amide linked ion pair receptors are demonstrated in the figures, other linkers may be used to link multifunctional or more than one type of receptor to surface functionalized nanoparticles including, by way of non-limiting example, siloxane, maleimide, dithiol, ester, as well as other linkers.

c) Doubly Functionalized Nanoparticles Based on an Amide-Linked Cation Receptor and a Triazine-Tethered Anion Receptor Single ion receptors are individually linked to magnetic nanoparticles with amide linkage for cation receptors or triazine-tethered for anion receptors. In this conjugation technique, magnetic nanoparticles are functionalized with both amine groups and azide anions that form an amide link to the cation sodium receptor or a triazine-tethered link to the chloride anion receptor (FIG. 13).

Figure 15A:
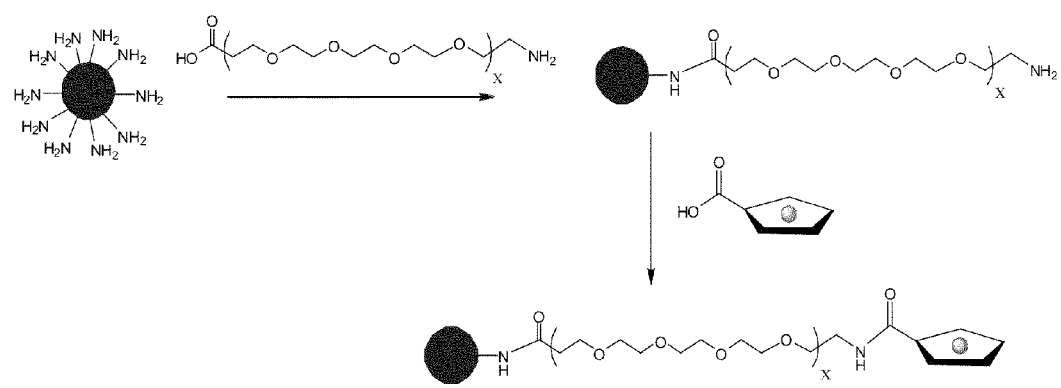
FIGS. 15A and 15B. PEG spacers of 4-24 units, 18.1 Å-108.6 Å, or longer (represented by x) used as linkers between nanoparticles and ion receptors. Individual cation and anion receptors as well as polymer receptors (not shown) may also be conjugated using PEG spacers (A). Dual PEGylated nanoparticles with varying lengths of both ion receptor terminated and methyl terminated PEG chains (B).

Receptors may be linked directly to functionalized magnetic nanoparticles or Poly(ethylene glycol) (PEG) spacers are used with modified ends (See Method D below) to link magnetic nanoparticles to individual receptors (FIGS. 15A and B). PEG spacers are preferred for their favorable solubility characteristics in aqueous solution, reduction of non-specific binding, enhanced stability, and better monodispersity.

Individual cation and anion receptors are capable of selectively binding to sodium and chloride, respectively. The sodium cation receptors are composed of a crown ether and the chloride anion receptor is composed of a macrocycle.

Similar individual ion receptors capable of binding to other cations and anions such as potassium, chloride, or fluoride have been synthesized.

d) PEG Spacers Linking Magnetic Nanoparticles to Ion Receptors

Magnetic nanoparticles may be linked directly to ion receptors or may be linked by means of PEG spacers of varying length. PEG spacers are used to coat the nanoparticles for favorable solubility characteristics in aqueous solution, reduction of non-specific binding, enhanced stability, and monodispersity.

Optimal length of the PEG chains mitigates complications with packing density and optimizes overcoming hydration energy. The different PEG chain lengths may vary from 4-24 units (18.1 Å-108.6 Å) or longer depending on the specific receptor.

As an example of possible PEG linkages magnetic nanoparticles are PEGylated with a carboxy-PEG-amine PEGylation reagent. Illustrated in FIGS. 15A and B, the carboxy-PEG-amine will bind to the amine groups on the surface of magnetic nanoparticles by a peptide bond between the carboxyl group on one end of the PEG with the amine group of the magnetic nanoparticles. The resulting PEGylated magnetic nanoparticles will consist of magnetic nanoparticles attached to PEG chains that end with amine groups on their unbound ends. The amine group attached to the ends of the PEG chains will act as the binding site for the modified carboxylic acid terminated ion pair multiple receptor or individual ion receptor.

The above embodiment using carboxy-PEG-amine PEGylation reagent as a spacer is one of many modified PEG spacers that may be used, as other groups may be added to the ends of the PEG chain for optimal linkage.

Figure 15B:
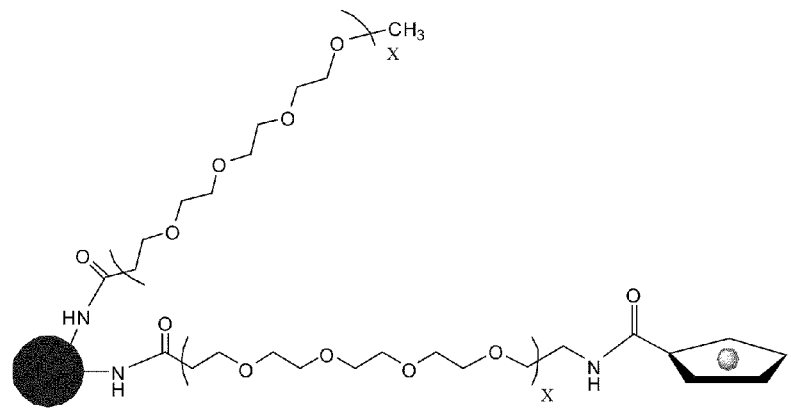
Figure 16:
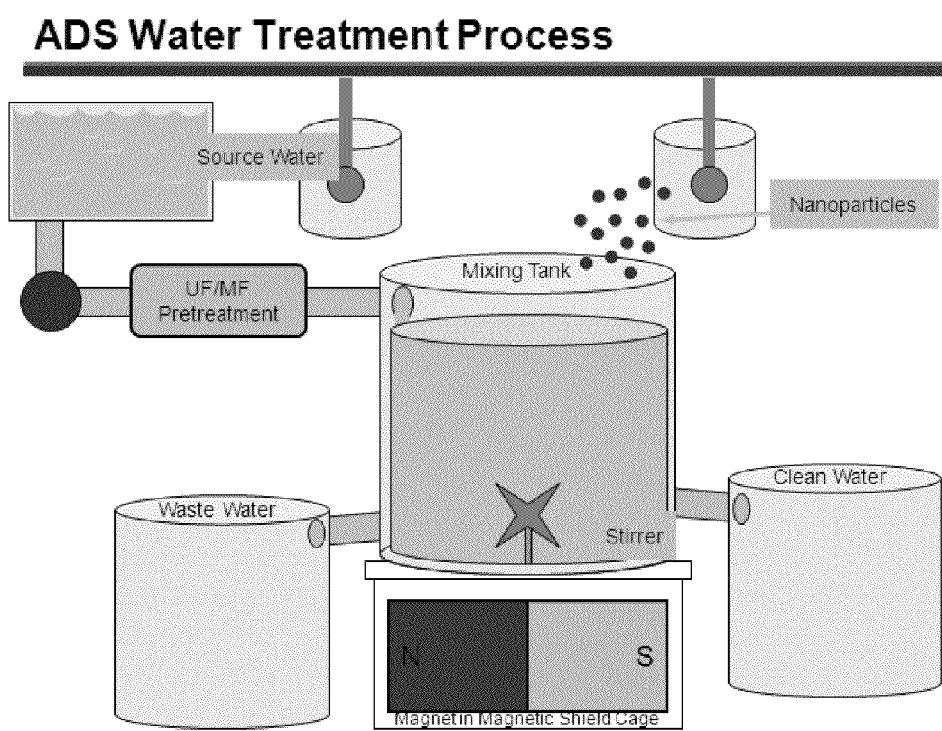
FIG. 16. Diagram of novel water treatment remediation process using magnetic nanoparticles.
Figure 17A:
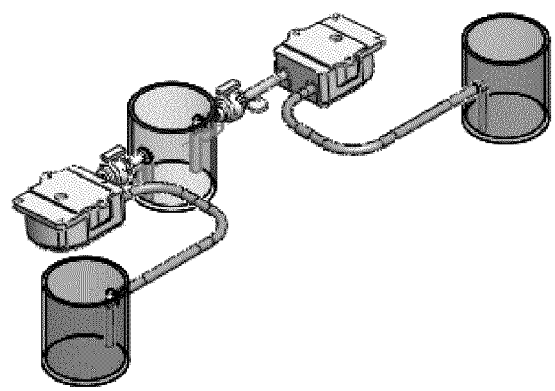
FIGS. 17A and 17B. Diagram of water remediation apparatus using magnetic nanoparticles. Mixing tank, clean water tank, and waste water tank. Permanent magnet, not shown, would be below mixing tank. Stirrer, not shown, would be in mixing tank. 2 way water pumps allow for water to flow from tank to tank for multiple cycles. All numbers are laboratory scale and can be scaled up or down as desired.
Figure 17B:
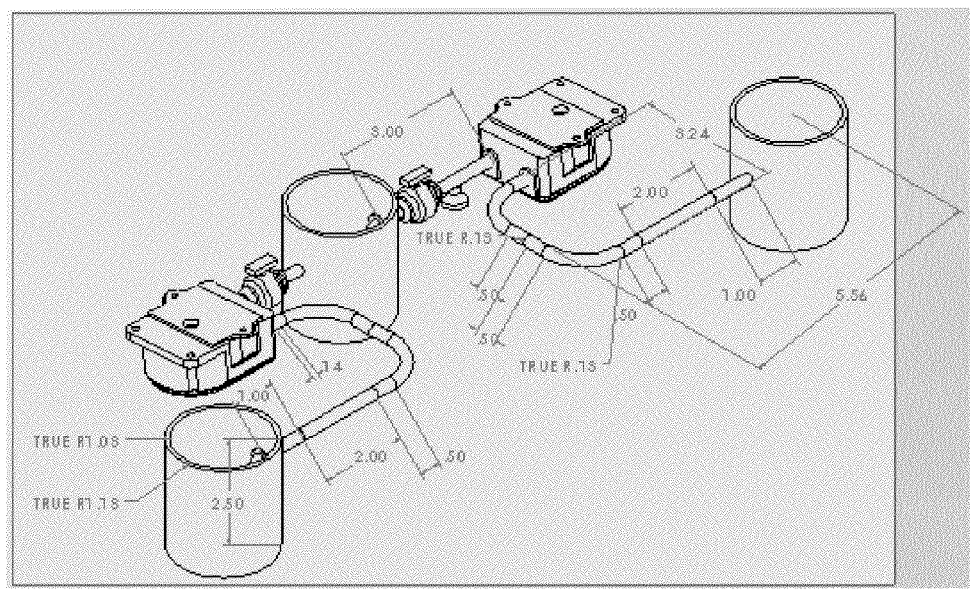
Figure 18:
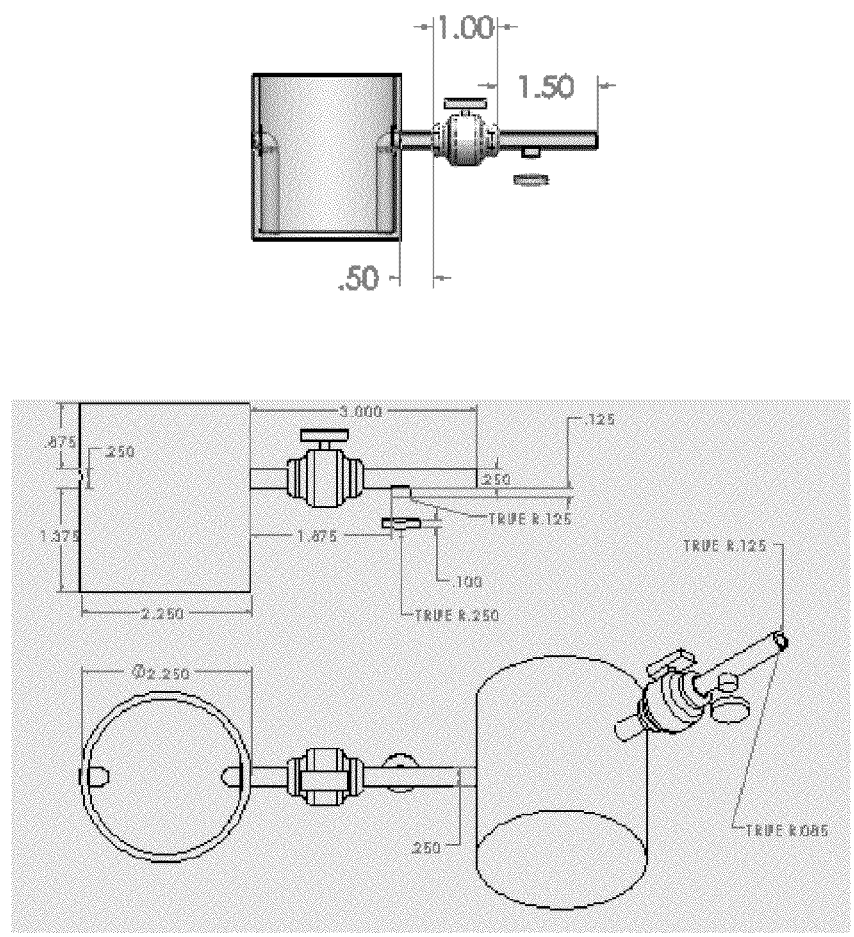
FIG. 18. Image of mixing tank with piping, pump and electromagnet for catching runoff nanoparticles and pulling them from solution before contaminating other tanks. All numbers are laboratory scale and can be scaled up or down as desired.
Figure 19:
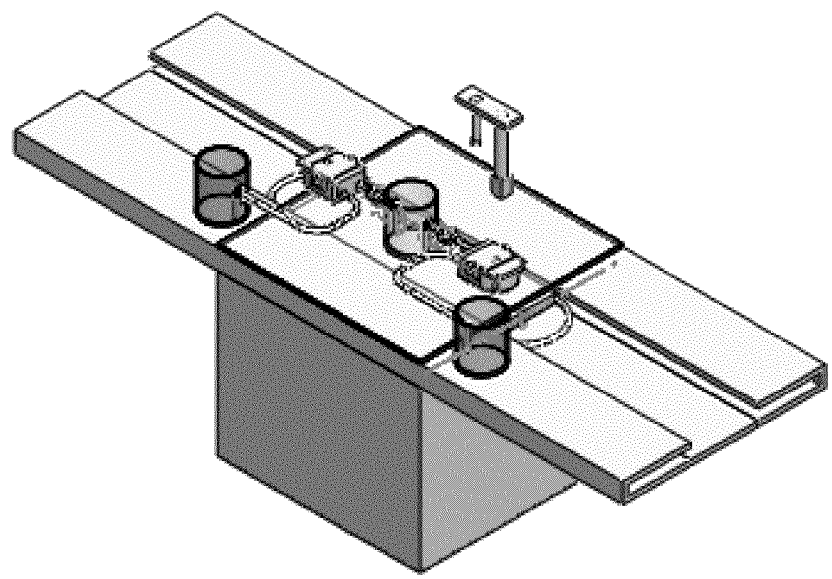
FIG. 19. Diagram of laboratory scale apparatus on magnetic cage with sliding magnetic cage cover. Stirrer illustrated above mixing tank.
Figure 20:
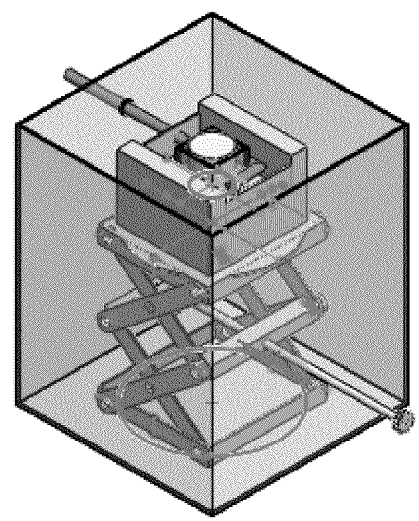
FIG. 20. Magnetic cage with jack for lifting and lowering permanent or electromagnet. Magnet in block container with lever for moving permanent magnet right and left.
Figure 21:
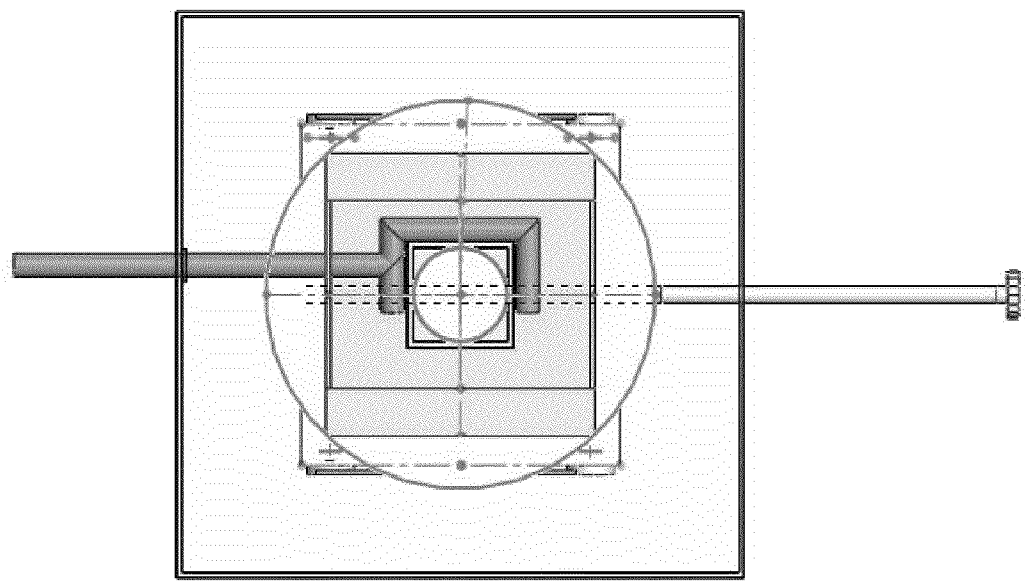
FIG. 21. Aerial view of magnet in magnet block container and lever for moving magnet right and left for proper decanting of magnetic nanoparticles.

FIG. 15B is an illustration of possible dual PEGylated magnetic nanoparticles with varying lengths of both ion receptor terminated and methyl terminated PEG chains. This method of dual PEGylation has been found to enhance solubility in aqueous solution, reduce non-specific binding, and aid with optimal packing density.

In other embodiments the nanoparticles are conjugated to a binding molecule that is selective to one or more specific target molecules, such as analytes, cations, anions, and/or molecules. The specific binding molecule is chosen based on the target to be bound.

In one typical method the magnetic nanoparticles are sonicated and amine conjugated by reacting with (3-aminopropyl)-triethoxysilane, toluene, and acetic acid with vigorous stirring. Typical conditions for conjugation are a temperature of from 15 to 30° C., preferably at a temperature of from 17.5 to 25 °0 for a period of from 48 to 90 hours, preferably for a period of from 60 to 80 hours.

Surfactants may be synthesized around the magnetic nanoparticles such as polyethylene glycol (PEG) or gold and the magnetic nanoparticles used without complexing with a receptor or as a further embodiment of the invention the magnetic nanoparticles may be attached to a receptor specific to the selected target or targets.

Various moieties may be utilized to functionalize the surface of the magnetic nanoparticles, including as nonlimiting examples, PEG, gold, amines, carboxyl groups, thiols, azides, or other linkers.

Synthetic receptors are then conjugated to the surface of the magnetic nanoparticles (FIGS. 1,2,13, and 15). Single receptors for individual analytes or multispecific receptors for two or more different analytes are complexed/conjugated to the magnetic nanoparticles. The use of two or more mono-specific receptors on the same magnetic nanoparticle is also within the scope of this disclosure.

Different linkers may be used to link the mono or multifunctional receptors to surface functionalized nanoparticles including, as nonlimiting examples, siloxanes, maleimides, dithiols or the receptors may be directly coupled to the magnetic nanoparticles.

Characterization is conducted between conjugation steps with DLS, TGA, TEM, SEM, AFM, zeta potential, FTIR, and SQUID magnetometry. Functionalized nanoparticles are optimized for size, shape, material, and magnetic characteristics.

The resulting conjugated magnetic nanoparticles are decanted, washed with toluene and dried under vacuum.

Characterization of the amine conjugated nanoparticle product may be obtained utilizing Fourier transform infrared spectroscopy (FTIR).

e) Conjugation of Functionalized Nanoparticles to Specific Receptor

In an embodiment of the invention useful in removing chloride ions from saline solutions, a carboxylated chloride receptor is converted to amine-reactive Nhydroxysulfosuccinimide (Sulfo-NHS) ester by mixing the carboxylated chloride receptor with 1-Ethyl-3-[3-dimethylaminopropyl]carbodiimide Hydrochloride (EDC) and SulfoNHS or uncharged NHS and left to react for from 10 to 30 minutes under vigorous mixing.

The reaction is quenched with Dithiothreitol (DTT). The resulting amine reactive chloride receptor is then mixed with amine conjugated magnetic nanoparticles a temperature of from 15 to 30° C., preferably at a temperature of from 17.5 to 25° C. for a period of from 75 to 150 minutes, preferably for a period of from 100 to 135 minutes.

The resulting functionalized magnetic nanoparticles conjugated to chloride receptors are washed with deionized (DI) water, decanted, and dried to be used in separation/extraction of chloride from aqueous solutions.

FIGS. 16-22 describe a method for water treatment using magnetic nanoparticles or other magnetic nanomaterials functionalized to a binding molecule such as receptors that are selective for specific analytes, ions, and/or molecules in water. Nanoparticles with or without surface functionalized coating may also be utilized to purify water by binding analytes, ions, and/or molecules to the modified surface charge of the nanoparticles or to bare nanoparticles. When nanoparticle complexes are combined with water the analytes, ions, and/or molecules of interest bind to the binding molecules conjugated to the nanoparticle surface or to nanoparticle surface functionalization thereby creating bound nanoparticle complexes.

Figure 22:
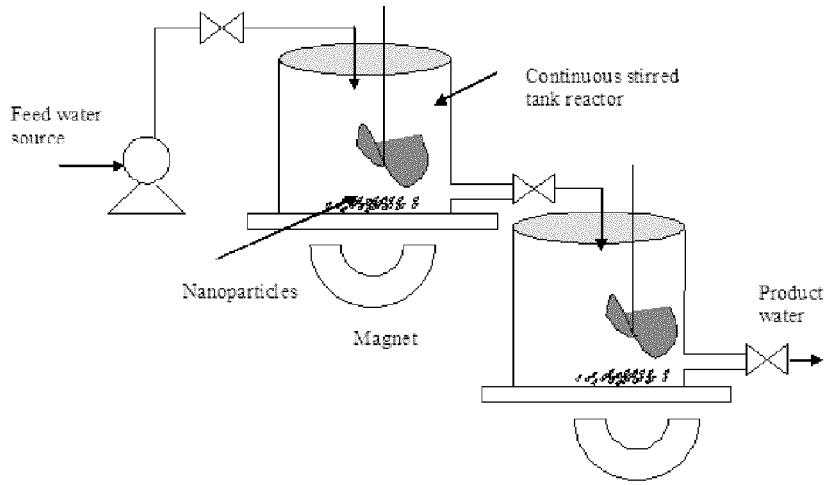
FIG. 22: Process flow diagram of novel desalination process using functionalized magnetic nanoparticles and continuous batch process.
Figure 23:
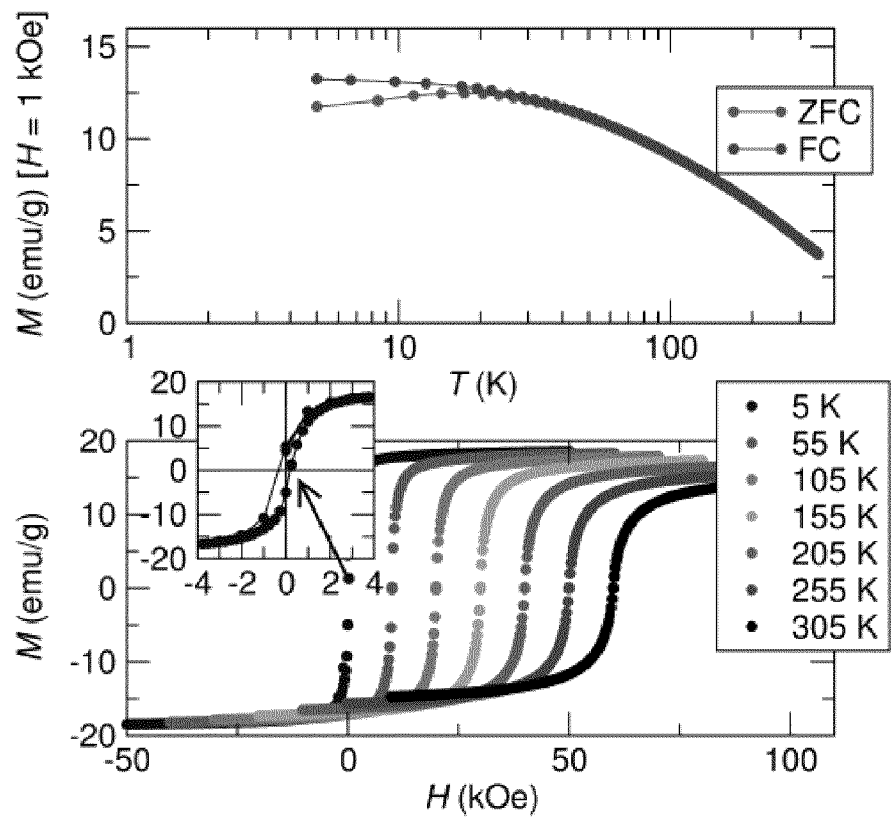
FIG. 23. Chart showing magnetic characterization of oleic acid coated iron oxide nanoparticles. Characterization work done using a Super Quantum Interference Device (SQUID) magnetometry.
Figure 24:
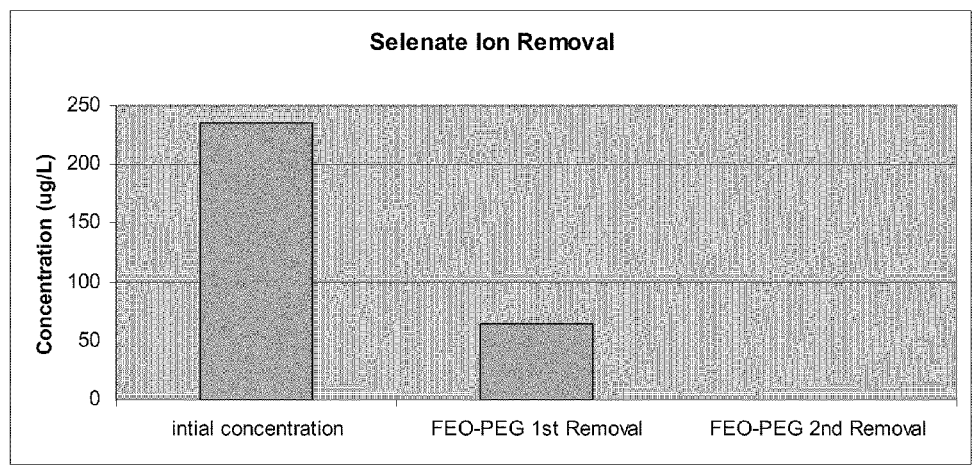
FIG. 24. Chart showing complete selenate ion removal from aqueous solution using 2 sequential treatments with PEG-OH surface functionalized iron oxide nanoparticles. Initial concentration of 234.6μg/L selenate was used. 15 mg (+/−3 mg) of material was used in 5 mL of selenate solution. After 1st removal regeneration of nanoparticles were done with NaOH cleaning solution.
Figure 25:
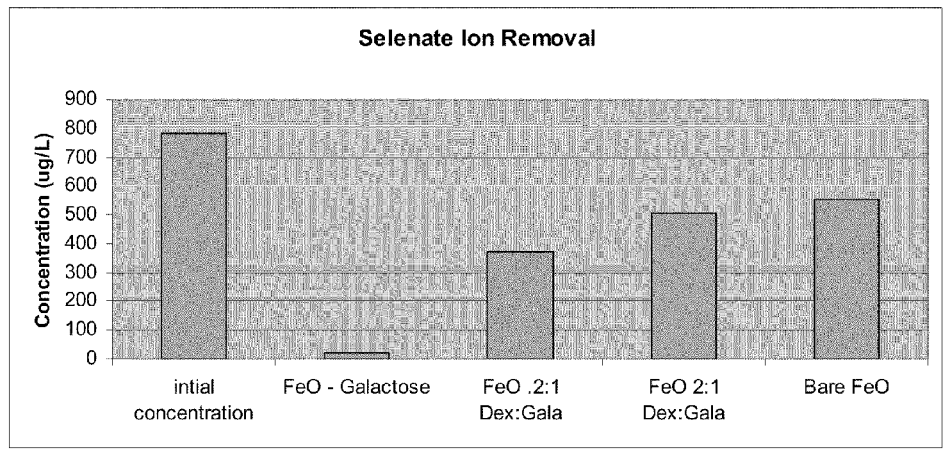
FIG. 25. Chart showing selenate ion removal from aqueous solution with initial selenate concentration of 782 μg/L. 15 mg (+/−3 mg) PEG-OH functionalized, Galactose functionalized, Dextran/Galactose 0.2:1 ratio functionalized, Dextran/Galactose 2:1 ratio functionalized, and bare iron oxide nanoparticles were used to treat water. All samples were 15 mg (+/−3 mg) of material in 5 mL of selenate solution.
Figure 26:
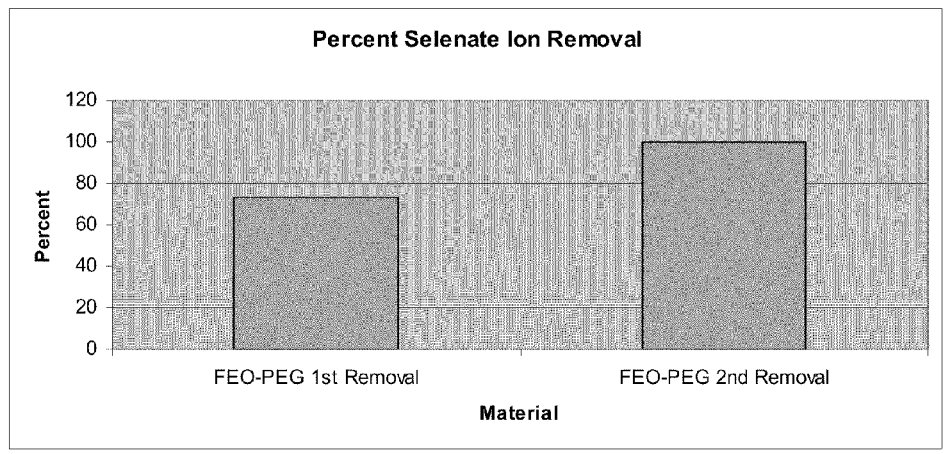
FIG. 26. Chart showing percent selenate ion removal of sequential treatment of aqueous solution with 15 mg PEG-OH surface functionalized nanoparticles in 5 ml of solution. After 1st removal regeneration of nanoparticles were done with NaOH cleaning solution.
Figure 27:
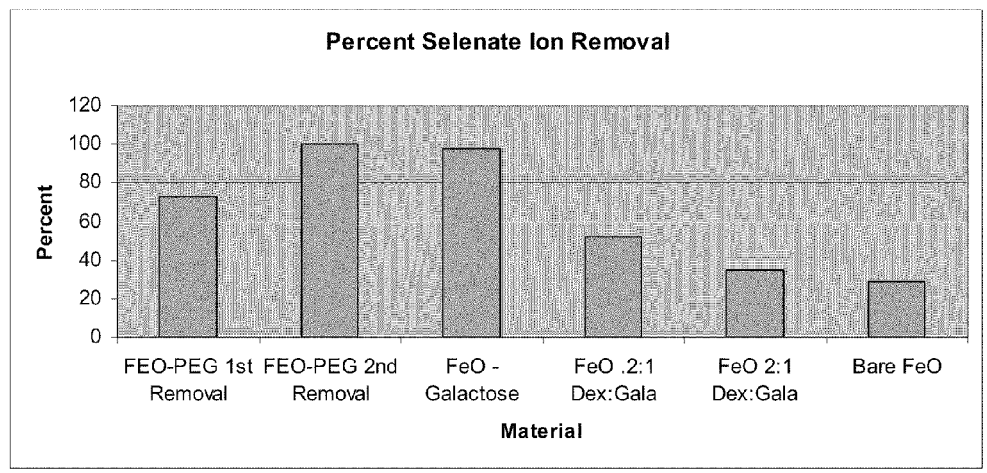
FIG. 27. Chart showing percent selenate ion removal of PEG-OH functionalized, Galactose functionalized, Dextran/Galactose 0.2:1 ratio functionalized, Dextran/Galactose 2:1 ratio functionalized, and bare iron oxide nanoparticles used to treat water where all samples used 15 mg (+/−3 mg) nanoparticulate material in 5 mL of selenate solution.

Strong rare earth magnets that do not use electricity or electromagnets with low energy consumption provide an electric field that attracts the nanoparticles to the bottom of the tank, or water receptacle, and purified water is produced. The process may be done multiple times to further purify the water of analytes, ions, and/or molecules of interest (FIG. 22).

The nanoparticles are reusable.

This methods disclosed herein simplify water treatment techniques and lessen the amount of energy needed for water treatment while also limiting environmental impact from brine and other harmful bi-products. Use of these methods will have a large positive environmental impact.

The disclosed method is in its various embodiments provides nanoparticles capable of complexing or conjugating with almost any molecule of interest and removing them from the liquid in which they are present.

Analytes, ions, and/or molecules that are of specific interest and that are capable of being extracted from water by the disclosed method include but are not limited to biologics and small molecules such as viruses, bacteria, antibodies, nucleic acids, proteins, cells, fatty acids, amino acids, carbohydrates, peptides, pharmaceutical products, toxins, pesticides and other organic materials; anions such as fluoride, chloride, bromide, sulfate, nitrate, silicate, chromate, borate, cyanide, ferrocyanide, sulfite, thiosulfate, phosphate (phosphorus), perchlorate, selenium compounds; cations such as sodium, potassium, calcium, magnesium, manganese, aluminum, nickel, ammonium, copper, iron, zinc, strontium, cadmium, silver, mercury, lead, arsenic selenium, gold and uranium. The process is unlimited as to the target and any target of interest may be chosen using an appropriate receptor selected from the receptors disclosed herein.

When selenium is the target, it may be in elemental form, as selenate, selenite, selenide, ionic forms, oxidated forms, found in organic compounds such as dimethyl selenide, selenomethionine, selenocysteine and methylselenocysteine, selenium isotopes, or selenium combined with other substances.

Target Binding

The surface functionalized, receptor functionalized or unconjugated bare nanoparticles are mixed with a liquid containing a target of interest such that the target molecules bind the target to the magnetic nanoparticles to form target-nanoparticle complexes. Aqueous liquids are particularly well suited to the process disclosed herein.

The liquid to be treated optionally may be subjected to a pretreatment step with an ultrafiltration/microfiltration pretreatment to remove large molecules and any other material that would decrease the efficiency of the treatment process.

The target binding step is most readily accomplished by simple mixing of the nanoparticles with the liquid for a period of time sufficient to allow the nanoparticles and target to come into contact with each other and to bind.

The three different types of nanoparticles: 1) surface functionalized nanoparticles; 2) receptor functionalized nanoparticles; and 3) bare unfunctionalized nanoparticles generally require a mixing time under ambient conditions are generally in the range of 1 min to 72 hours, preferably in the range of 1 min to 1 hr.

It will be understood by those versed in the art that the relative quantities of nanoparticles and of target will play a role in the amount of time required for binding, the fewer the number of targets and the more dilute the solution the longer it will take to achieve binding.

The quantity of nanoparticles per liter of liquid from which the target is to be removed is dependent upon the amount of target in the liquid.

It will be understood by those versed in the separation arts, that the quantity of nanoparticles to be used is also a function of the amount of target present in the liquid. Where the liquid is highly contaminated with the target to be removed the ratio of target moiety to nanoparticles should be from 0.01 moiety of nanoparticles per moiety of target to about 10,000 moieties nanoparticles per moiety of target.

Where the liquid is lightly contaminated with the target to be removed the ratio of target moiety to nanoparticles should be from 0.01 moiety nanoparticles per moiety of target to about 10,000 moieties nanoparticles per moiety of target.

The number of sequential separations will differ depending of the level of contamination.

Separation

Once the magnetic nanoparticles (or target binding molecules) have bound the target molecules, the bound nanoparticle complexes are separated from the liquid using a magnetic field.

The magnetic field used for extracting bound-nanoparticle complexes (as well as any unbound magnetic nanoparticles) can be supplied in any known manner. The magnetic field may be generated by one or more external magnets to generate a magnetic field flux is between about 100 Gauss and about 150,000 Gauss, preferably between about 100 and about 60,000 Gauss, most preferably between about 5,000 and about 30,000 Gauss.

The magnetic field can be configured in any manner such that the field forces the magnetic nanoparticles to collect in a defined portion of the liquid. In a preferred embodiment the applied magnetic field is configured to collect the nanoparticles at the bottom of the container holding the liquid containing the nanoparticles.

Although any type of magnet(s) may be utilized to generate the magnetic field, rare earth magnets, electromagnets and/or superconducting electromagnets are preferably used to provide the magnetic field. In a particularly preferred embodiment, rare earth magnets of 5,000 to 30,000 Gauss are used.

Extraction

The extraction step involves the use of an external magnetic field to segregate the magnetic nanoparticles some or all of which are complexed with bound target for the remaining portion of the liquid. The extraction may be a batch or continuous process.

The external magnetic field may be formed by any type of magnet having a sufficient field force. Strong rare earth magnets that do not use electricity or electromagnets with low energy consumption provide a magnetic field that attracts the nanoparticles to the as specified location depending of the specific process and apparatus configuration but typically at the bottom of the liquid receptacle containing the liquid to be purified, and purified water is produced.

The process may be repeated multiple times to further purify the water of analytes, ions, and/or molecules of interest (FIG. 22). The nanoparticles are regenerated and are reusable.

In a typical one tank batch embodiment, the liquid is held in a mixing tank fitted with a stirrer. The stirrer can be a continuous stirrer, non-continuous stirrer, a magnetic stirrer, or other mixing apparatus that ensures proper mixing of the liquid and nanoparticles.

Functionalized or unfunctionalized nanoparticles are mixed with the contaminated water from 1 to 1440 minutes, preferably between about 15 and about 200 minutes, most preferably between about 30 and about 60 minutes with the aid of the mixing apparatus.

In a specific embodiment relating to desalination of water, the desalination performance of the process utilizing functionalized nanoparticles having high affinity for sodium chloride, the saline solution is mixed with varying amounts of functionalized magnetic iron oxide nanoparticles in different vials. Sonication allows the dispersion of magnetic nanoparticles. The salt bound dispersed nanoparticles are then separated from the solution by applying a magnetic field (~1 T) using a permanent magnet.

Once placed in the magnetic separator, the solution becomes clear with deposition of salt encapsulated nanoparticles on the end of the vial where magnet is placed. The process is repeated by collecting the clean solution and exposing the container again to the functionalized nanoparticles in another container.

Finally, the clean solution (product water) is collected and analyzed for key performance parameters including (i) concentration of sodium chloride (salinity) in clean product water (ii) sodium chloride binding capacity of functionalized nanoparticles (iii) percentage salt removal efficiency (iv) change in pH of the solution (v) presence of any organic compounds.

The concentration of sodium in the aqueous solution is measured by atomic absorption spectroscopy or sodium probe. Initial & final concentrations of chloride in aqueous solution are analyzed by ion chromatography or chloride probe. The salinity of water is determined by standard measurement of electrical conductivity using a conductivity meter.

FIGS. 16-22 are examples of a design of for a desalination plant using the disclosed process.

For large-scale applications, a process flow diagram shown in FIG. 22 may be used. The process consists of continuous stirred tanks in series (feed water being pumped to the stirred reactor.

The functionalized nanoparticles are added to the reactor continuously depending on the volume of water that needs to be treated. After the tank is filled with water, the stirrer will mix and the exit valve will be closed. Once the reaction has equilibrated, a magnetic field will be applied, preferably using a permanent magnet at the bottom of the reactor with an open exit valve from tank 1. The nanoparticles will be collected at the bottom of the tank. The water flows to the next reactor in series by gravitation or with low pressure pumps.

A similar modified batch process procedure may be implemented for all the reactors in series. The number of reactor in series will depend on the desired salinity of product water. To evaluate the performance of the process, the concentration of sodium chloride in water will be analyzed at each stage by conductivity meter.

Following treatment, the bound sodium chloride will be eluted off nanoparticles and will be reused.

In another embodiment, a permanent magnet of variable magnetic force depending on size of magnet is situated proximate to the tank in a magnetic shield cage that limits excess magnetic fields out of the magnetic shield cage. After sufficient equilibration mixing, the separating lid of the magnetic shield is removed and the external magnetic field pulls nanoparticles down to the bottom or other part of the mixing tank.

In a multiple tank batch process one or more mixing tanks are connected to an extraction tank. The mixing tanks are connected seriatim to the extraction tank. When each mixing tank has reached equilibrium, it is connected to the extraction tank.

The residence time in the extraction tank is much shorter than the time in the mixing tank. Typical residence times are from 1 to 30 minutes, preferably between about 2 and about 15 minutes, most preferably between about 3 and about 10 minutes.

In one embodiment of a continuous process the nanoparticles are mixed with the liquid in a multiple tube reactor of varying length baffled to cause turbulent flow in the tubes thereby ensuring intimate contact between the nanoparticles and the target moiety. The length of the tubes and the flow speed through the tubes are constrained to allow sufficient time for optimal conjugation of the nanoparticles with the target before the tubes enter a magnet field of sufficient strength to separate the particles from the liquid. The liquid is decanted over the top of an open topped vessel and the magnetic target bound nanoparticles continuously removed from the bottom of the vessel.

An alternative embodiment of a continuous process utilizes counter current flow upright reactors where the untreated liquid reaches binding equilibrium as it flows through the reactor and the effluent is separated by a magnetic field where the target bound nanoparticles are separated by gravity or other means.

An alternative embodiment of a continuous process utilizes one mixing tank with pumps where the untreated liquid reaches binding equilibrium with nanoparticles and the nanoparticles are separated by a magnetic field. The clean water flows to the clean water tank with the use of 2 way low pressure water pumps. The nanoparticles are washed for reuse and separated from wash solution with a magnetic field. The wash solution is then pumped to the wastewater tank. The water in the clean water tank can be pumped back into the mixing tank for multiple cycles of purification. The wastewater can also be pumped back to the mixing tank for reuse limiting wastewater quantities used.

Electromagnets or permanent magnets between mixing tank and other tanks may be used for trapping unwanted nanoparticles that may have flowed out of tanks to limit contamination.

The tanks and piping of the magnetic separation stage is made of materials such as polymers or non-magnetic metals that will not interfere with the magnetic separation.

Regeneration & Cleaning

The remaining liquid that is free of contamination is then collected in the clean liquid tank using gravitational force, pumping force, or any other force.

The magnetic shield cage lid is returned onto the magnet and a cleaning solution such as NaOH 2.0M, HCl, or other cleaning solutions, is mixed with the nanoparticles in the mixing tank with the use of the stirrer for 1 min to 24 hours. When fully equilibrated, the magnetic shield lid is removed once more and nanoparticles are decanted to the bottom of the tank, leaving waste water composed of cleaning solution and ions, molecules, or other contamination removed from source water. The waste water is collected in the waste water tank using similar methods as the clean water tank collection. The nanoparticles are now ready for reuse and the process begins from the beginning with contaminated water from the source going through a pretreatment process and collected in the mixing tank where it is mixed with nanoparticles that are in the tank (FIG. 16-19).

In certain embodiments, rare earth magnets and/or electromagnets are used to provide the magnetic field. In another preferred embodiment, a superconducting electromagnet can be used.

In certain embodiments, the water treatment process includes source-contaminated water that is pretreated with an ultrafiltration/microfiltration pretreatment to remove large molecules and biological material. The water is then held in a mixing tank fitted with a stirrer. The stirrer in certain embodiments can be a continuous stirrer, non-continuous stirrer, a magnetic stirrer, or other stirrer embodiments. Functionalized or unfunctionalized nanoparticles are mixed with the contaminated water from 1 min to several hours with the aid of the stirrer. In certain embodiments the tank is made of non-magnetic material such as polymers or nonmagnetic metals.

A permanent magnet of variable magnetic force depending on size of magnet is situated, for example, under the tank in a magnetic shield cage that limits excess magnetic fields out of the magnetic shield cage. After sufficient equilibration mixing, the separating lid of the magnetic shield is removed and the external magnetic field pulls nanoparticles down to the bottom of the mixing tank.

The remaining water that is free of contamination is then collected in the clean water tank using gravitational force, pumping force, or any other force.

The magnetic shield cage lid is returned onto the magnet and a cleaning solution such as NaOH 2.0M, HCl, or other cleaning solutions, is mixed with the nanoparticles in the mixing tank with the use of the stirrer for 1 min to 24 hours.

When fully equilibrated, the magnetic shield lid is removed once more and nanoparticles are decanted to the bottom of the tank, leaving waste water composed of cleaning solution and ions, molecules, or other contamination removed from source water. The waste water is collected in the waste water tank using similar methods as the clean water tank collection.

The nanoparticles are now ready for reuse and the process begins from the beginning with contaminated water from the source going through a pretreatment process and collected in the mixing tank where it is mixed with nanoparticles that are in the tank (FIG. 16-22).

EXAMPLE 1

Figure 5A:
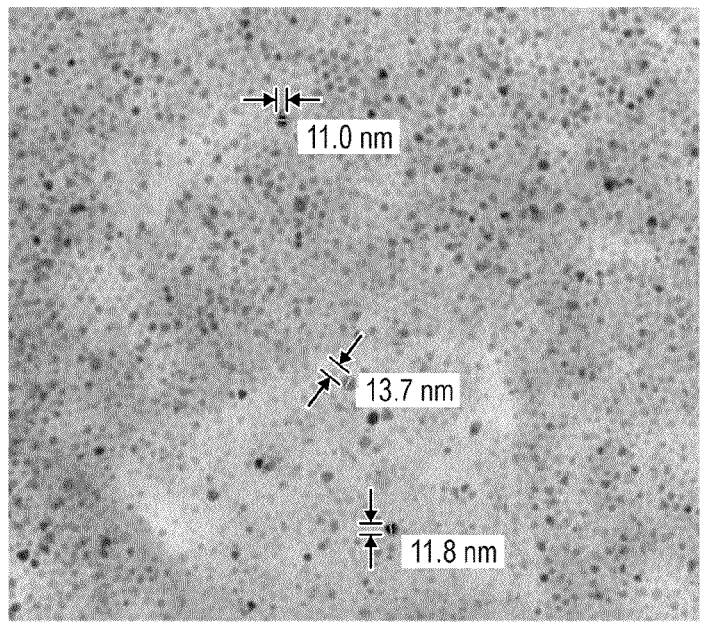
FIGS. 5A and 5B. Transmission Electron Microscopy bright field images of monodispersed approx. 7 to 13 nm magnetite nanoparticles.
Figure 5B:
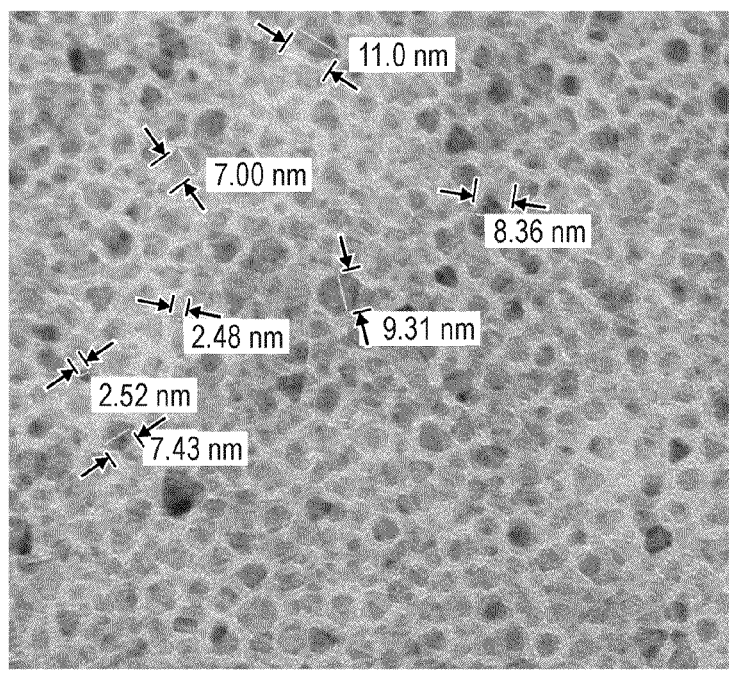
Figure 6:
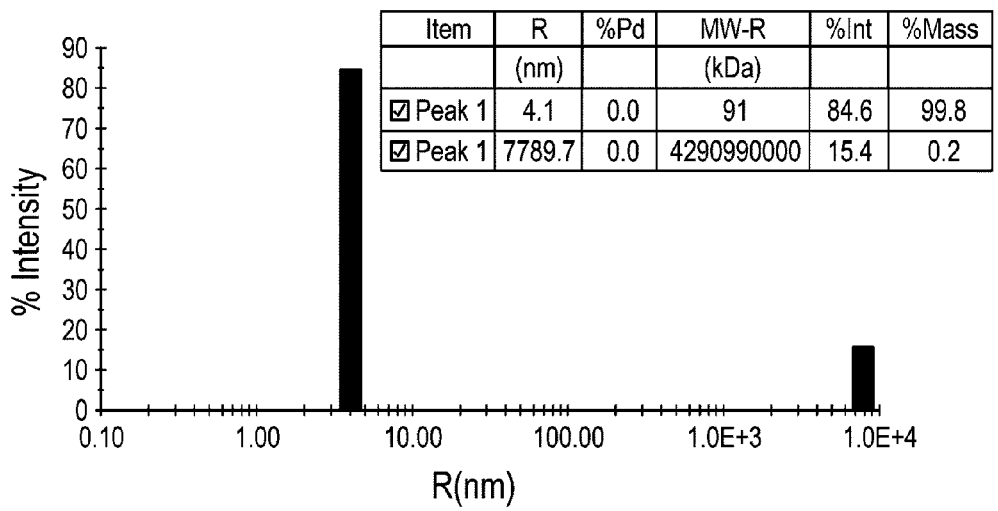
FIG. 6. DLS of thermal decomposition monodispersed 4 nm Radius (8 nm diameter) iron oxide nanoparticles

Chloride Removal from Aqueous Solutions Using Functionalized Superparamagnetic Iron-Oxide Nanoparticles Synthesis of Magnetic Nanoparticles:

In this example, superparamagnetic iron oxide (magnetite) nanoparticles were synthesized. The synthesis included thermal decomposition of a metal precursor in the presence of a stabilizing ligand as a surfactant. The exact synthesis combined Iron(III) acetylacetonate, benzyl ether, 1,2 hexadecanediol, oleic acid and oleylamine mixed under Ar gas, heated for 1 hour at 150° C. and subsequently for 2 hours at 300° C. for growth. The product was washed with ethanol and decanted on a permanent magnet. The resulting nanoparticles were filtered and then characterized after re-suspension in Toluene by the use of Dynamic Light Scattering (DLS) and Transmission Electron Microscopy (TEM) (FIGS. 5A-6). In this example the ratio and quantity of compounds was 20 mL benzyl ether, 0.706 g Fe(acac)$_3$, 2.58 g 1,2-hexadecanediol, 1.89 mL oleic acid, and 1.97 mL oleylamine.

Conjugation of Nanoparticles:

The nanoparticles were conjugated to a binding molecule that is selective to one or more specific target molecules, such as analytes, cations, anions, and/or molecules. The specific binding molecule is chosen based on the target to be bound.

In this example, magnetite nanoparticles are sonicated and amine conjugated by reacting with (3-aminopropyl)-triethoxysilane, toluene, and acetic acid for 72 hr with vigorous stirring. The product is decanted and washed with toluene and dried under vacuum. The amine conjugated nanoparticles are characterized with Fourier transform infrared spectroscopy (FTIR) (FIG. 7). A carboxylated chloride receptor is converted to amine-reactive Nhydroxysulfosuccinimide (Sulfo-NHS) esters by mixing the carboxylated chloride receptor with 1-Ethyl-3-[3-dimethylaminopropyl]carbodiimide Hydrochloride (EDC) and SulfoNHS or uncharged NHS and left to react for 15 minutes under vigorous mixing. The reaction is quenched with Dithiothreitol (DTT). The resulting amine reactive chloride receptor is then mixed with amine conjugated magnetite nanoparticles for 2 hrs. The resulting functionalized magnetite nanoparticles conjugated to chloride receptors are washed with deionized (DI) water, decanted, and dried to be used in separation/extraction of chloride from water.

The quantities of materials used and ratios thereof for amine conjugation are 24 mg magnetite nanoparticles dissolved in 26 mL toluene, 0.55 mL of (3-aminopropyl)-triethoxysilane, and 3.6μL of acetic acid.

Separation/Extraction:

The conjugated or unconjugated nanoparticles are mixed with water such that the target molecules, such as perchlorate, selenium, sodium, or chloride are bound by the magnetic nanoparticles forming bound-nanoparticle complexes. Once the magnetic nanoparticles (or target binding molecules) have bound the target molecules, the bound-nanoparticle complexes are separated from the water using a magnetic field.

Rare earth magnets and/or electromagnets provided the magnetic field used for extracting bound-nanoparticle complexes (as well as any unbound magnetic nanoparticles).

A known concentration of aqueous solution with chloride was mixed with a known mass of superparamagnetic iron-oxide nanoparticles functionalized with chloride receptors or unfunctionalized magnetic nanoparticles. The mixture solution was allowed to equilibrate for greater than 40 minutes. The magnetic nanoparticles were decanted by a permanent magnet leaving a purified solution. The chloride concentration of the clear eluted solution was measured using a calibrated Ion-Selective Chloride electrode, conductivity meter, and/or ion chromatography. The binding capacities were determined based on the following equations:

$$[\text{chloride ion}]_b = [\text{chloride ion}]_{initial} - [\text{chloride ion}]_{final}$$

$$BC = \frac{[\text{salt ion}]_b}{C_d}$$

where [Chloride ion]$_{initial}$ and [chloride ion]$_{final}$ are the initial and final makeup water concentration (mg/L) of chloride ions in aqueous solution. $C_d$ is the concentration of nanoparticles in solution (g/L). BC is the binding capacity of milligram of chloride ion bound per each gram of nanoparticle in solution.

Figure 9:
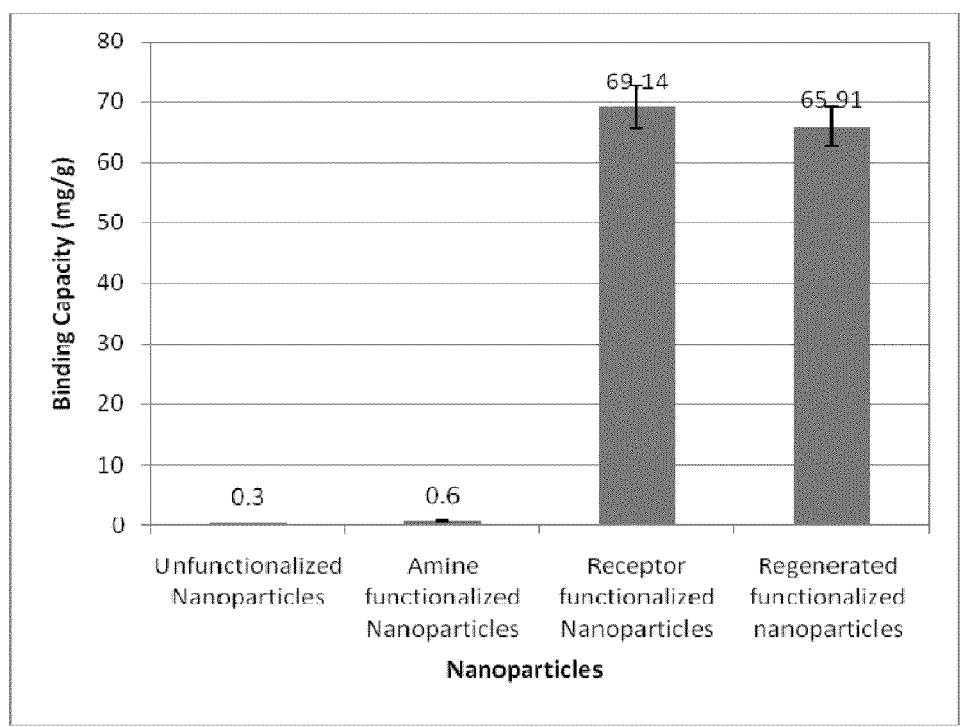
FIG. 9. Binding capacity of functionalized nanoparticles compared to unfunctionalized and amine functionalized nanoparticles.

The re-usability of the functionalized magnetic nanoparticles was assessed by desorption of the bound chloride from the functionalized nanoparticles by washing the particles with 0.2 M NaOH for 1 to 15 minutes. The functionalized nanoparticles were recovered by magnetically decanting and further washed with deionized water using a similar process. The regenerated functionalized nanoparticles were reused for chloride binding. The chloride binding capacities of functionalized magnetic nanoparticles was in the range of about 62 to 66 mg/g and regenerated functional nanoparticles had a similar binding capacity showing the successful re-usability of the functionalized magnetic nanoparticles (FIG. 9). Such binding capacity of functionalized nanoparticles is comparable to ion-exchange resins for chloride removal from wastewater.

Figure 10:
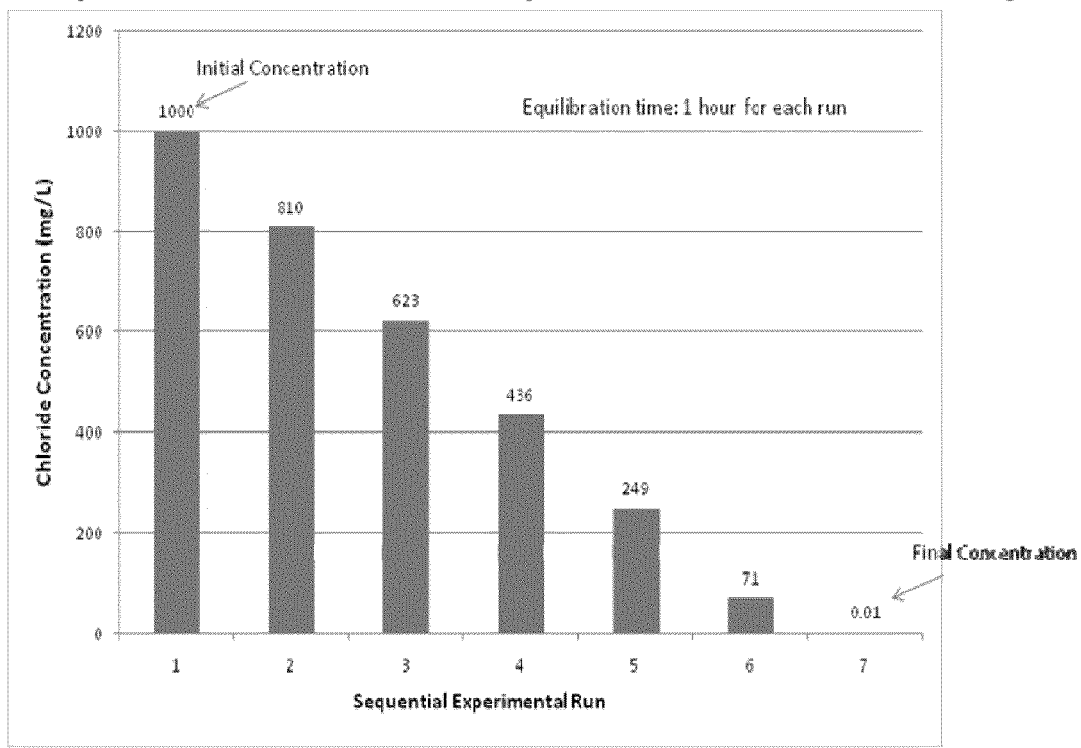
FIG. 10. Sequential removal of chloride with nanoparticles functionalized to chloride receptors. With six runs of the ADS water treatment process the 10 mL solution of 1000 mg/L concentration of chloride had a final concentration of 0.01 mg/L chloride.
Figure 11:
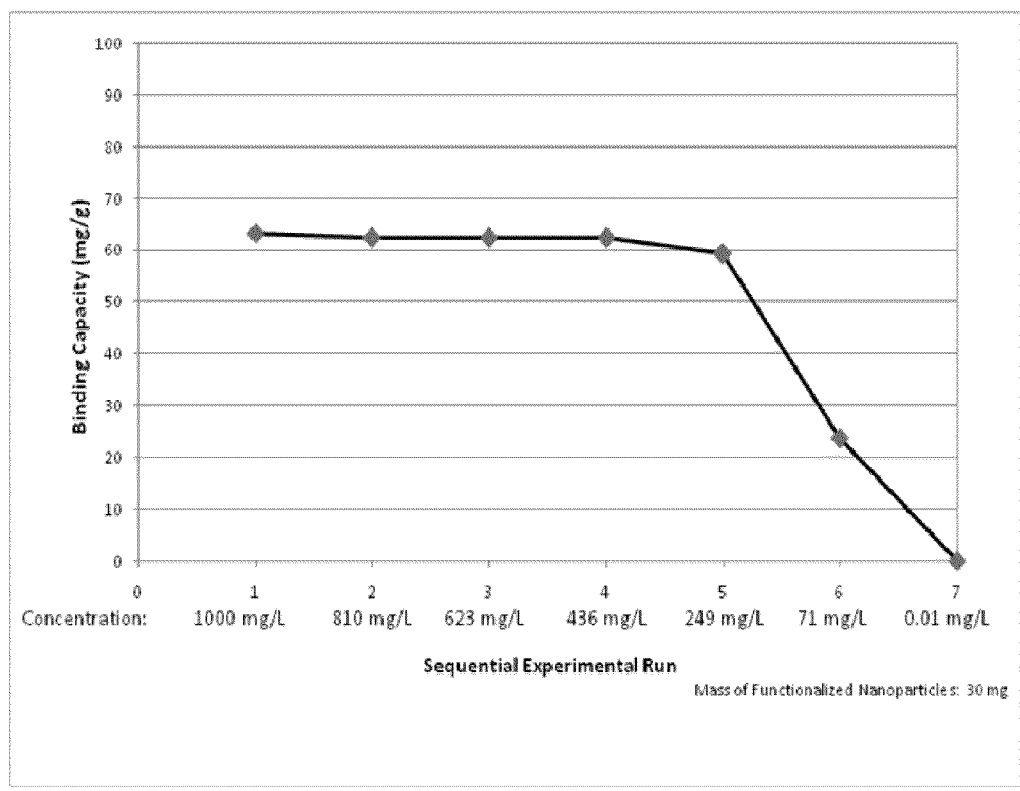
FIG. 11. Binding capacity of sequential chloride removal with initial concentration of 1000 mg/L to a final concentration of 0.01 mg/L. Binding capacity is stable at about 62 mg/gram of nanoparticles, showing stable reusability.
Figure 12:
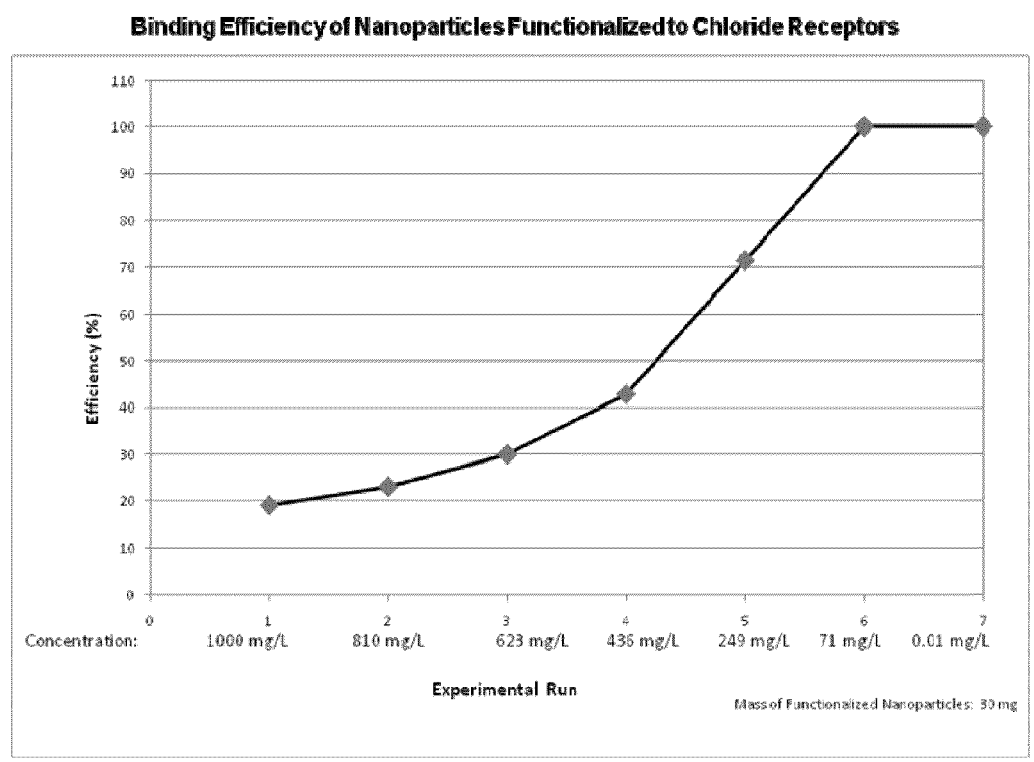
FIG. 12. Binding efficiency of nanoparticles functionalized to chloride receptor for sequential chloride removal. The efficiency is greater when ratio of nanoparticle to concentration of chloride is favorable.

The sequential removal of chloride from an initial concentration of 1000 mg/L to a final concentration of 0.01 mg/L was accomplished with six sequential experimental runs using 30 mg of nanoparticles functionalized with chloride receptor (FIG. 10). Experimental runs of 10 mL each comprised of DI water with NaCl were used. Binding capacity was about 62 mg of chloride per gram of nanoparticle material and lessened with later runs due to very small concentrations of chloride (FIG. 11). Efficiency was low at around about 23% in the first run and increases due to the ratio of nanoparticles to concentration of chloride ions (FIG. 12). Capacity and efficiency was expected to be higher with larger concentration and quantity.

EXAMPLE 2

Sodium Removal from Aqueous Solutions Using Surface Functionalized Superparamagnetic Iron-Oxide Nanoparticles

Synthesis of Magnetic Nanoparticles.

In this example, superparamagnetic iron oxide (magnetite) nanoparticles were synthesized. The synthesis included thermal decomposition of a metal precursor in the presence of a stabilizing ligand as a surfactant. The exact synthesis combined Iron(III) acetylacetonate, benzyl ether, 1,2 hexadecanediol, oleic acid and oleylamine mixed under Ar gas, heated for 1 hour at 150° C. and subsequently for 2 hours at 300° C. for growth. The product was washed with ethanol and decanted on a permanent magnet. The resulting nanoparticles were filtered and then characterized after re-suspension in Toluene by the use of DLS and TEM (FIGS. 5A-6). In this example the ratio and quantity of compounds was 20 mL benzyl ether, 0.706 g Fe(acac)$_3$, 2.58 g 1,2-hexadecanediol, 1.89 mL oleic acid, and 1.97 mL oleylamine.

Surface Functionalization of Nanoparticles:

The nanoparticles were surface functionalized with a charged polymer that modifies surface of nanoparticles to bind selectively to one or more specific target molecules, such as analytes, cations, anions, and/or molecules. The surface functionalization also provides monodispersity to nanoparticles for greater surface ratio for increased ion binding to surface. The specific surface functionalization is chosen based on the target to be bound.

In this example, the magnetite nanoparticles are sonicated and amine conjugated by reacting with (3-aminopropyl)-triethoxysilane, toluene, and acetic acid for 72 hr with vigorous stirring. The product is decanted and washed with toluene and dried under vacuum. The amine conjugated nanoparticles are characterized with FTIR (FIG. 7). Poly acrylic acid coats the surface of magnetic nanoparticles by mixing poly acrylic acid of Mw~100,000 with magnetic nanoparticles and 1-Ethyl-3-[3-dimethylaminopropyl]carbodiimide Hydrochloride (EDC) and left to react for 30 minutes under vigorous mixing. The resulting magnetite nanoparticles surface functionalized with poly acrylic acid are washed with deionized (DI) water, decanted, and dried to be used in separation/extraction of cations such as sodium from water.

The quantities of materials used and ratios thereof for amine conjugation are 24 mg magnetite nanoparticles dissolved in 26 mL toluene, 0.55 mL of (3-aminopropyl)-triethoxysilane, and 3.6 µL of acetic acid.

The quantities of materials used for surface functionalization with poly acrylic acid is 100 mg amine conjugated nanoparticles, 2.5 ml of PAA solution of 35% wt in H$_2$O Mw~100,000, and 19.122 mg EDC.

EXAMPLE 3

Selenate Removal from Aqueous Solutions Using PEG-OH Surface Functionalized Superparamagnetic Iron-Oxide Nanoparticles

Synthesis of Magnetic Nanoparticles.

In this example, superparamagnetic iron oxide (magnetite) nanoparticles were synthesized. The synthesis included thermal decomposition of a metal precursor in the presence of a stabilizing ligand as a surfactant. The exact synthesis combined Iron(III) acetylacetonate, benzyl ether, 1,2 hexadecanediol, oleic acid and oleylamine mixed under Ar gas, heated for 1 hour at 150° C. and subsequently for 2 hours at 300° C. for growth. The product was washed with ethanol and decanted on a permanent magnet. The resulting nanoparticles were filtered and then characterized after re-suspension in Toluene by the use of DLS and TEM (FIGS. 5A-6). In this example the ratio and quantity of compounds was 20 mL benzyl ether, 0.706 g Fe(acac)$_3$, 2.58 g 1,2-hexadecanediol, 1.89 mL oleic acid, and 1.97 mL oleylamine.

Surface Functionalization of Nanoparticles:

The nanoparticles were surface functionalized with a poly (ethylene glycol) with a hydroxyl group (OH-PEG) that modifies surface of nanoparticles to bind selectively to one or more specific target molecules, such as analytes, anions, and/or molecules. The surface functionalization also provides monodispersity to nanoparticles for greater surface ratio for increased ion binding to surface. The specific surface functionalization is chosen based on the target to be bound.

Figure 8:
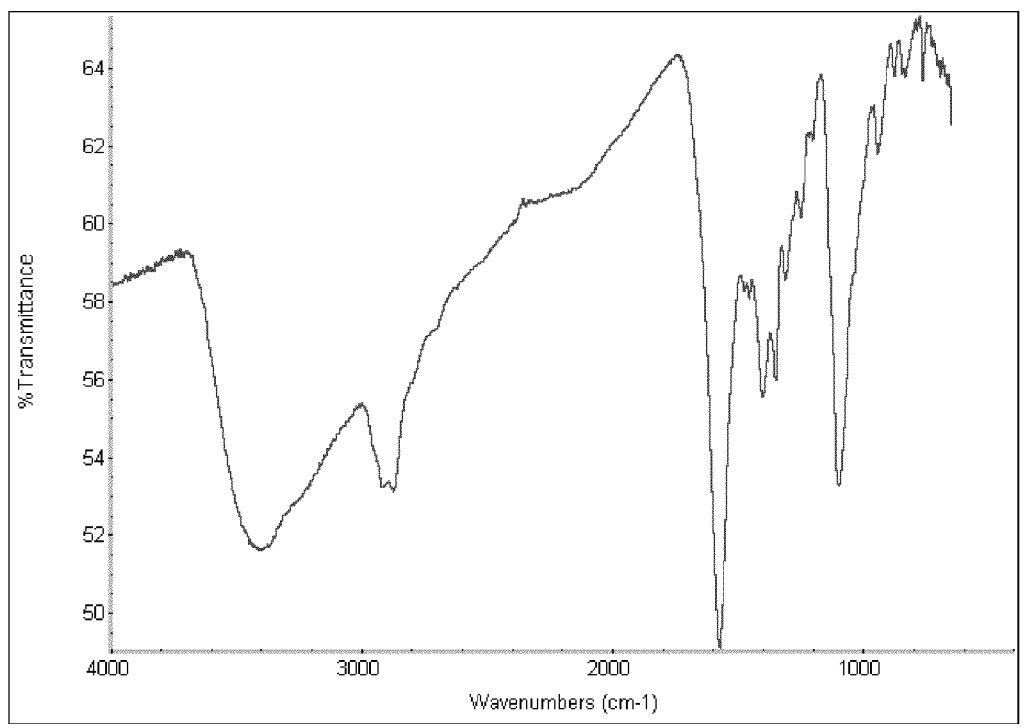

In this example, magnetite nanoparticles synthesized with oleic acid and oleylamine are resuspended in toluene, sonicated, and mixed with acetic acid and poly(ethylene glycol) that has both carboxyl and hydroxyl groups at the terminal ends (OH-PEG-COOH). The mixture is stirred vigorously for 72 hrs and then mixture is decanted and washed with toluene and dried under vacuum. The carboxyl group forms a bond with OH groups on surface of iron oxide nanoparticles displacing the oleic acid and crosslinking OH-PEG-COOH to surface of nanoparticles. The resulting nanoparticles have been surface functionalized with PEG that has an OH at its terminal end. PEG-OH nanoparticles are characterized with Fourier transform infrared spectroscopy (FTIR) (FIG. 8).

The quantities of materials used and ratios thereof for PEG-OH surface functionalization are 20 mg magnetite nanoparticles dissolved in 20 mL toluene, 20 mg of OH-PEG4-COOH dissolved in 10 ml of Toluene, and 3 µL of acetic acid.

EXAMPLE 4

Selenate Removal from Aqueous Solutions Using Bare Superparamagnetic Iron-Oxide Nanoparticles

Synthesis of Bare Magnetic Nanoparticles:

A co-precipitation method was used to synthesize superparamagnetic iron oxide nanoparticles whereby a solution of FeCl$_2$ and FeCl$_3$ were mixed and the reaction is left to react for 1 hour at room temperature to 37° C. Nanoparticles are decanted on a permanent magnet or centrifugation is used to separate nanoparticles. The nanoparticles are washed 3-5 times with DI water. No stabilizers are used in solution and nanoparticles are bare. Bare magnetic nanoparticles are characterized with DLS.

Co-precipitation synthesis equation:

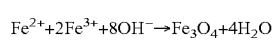

$$Fe^{2+} + 2Fe^{3+} + 8OH^- \rightarrow Fe_3O_4 + 4H_2O$$

EXAMPLE 5

Separation/Extraction for All 4 Examples

The ligand receptor conjugated, surface functionalized, or bare nanoparticles are mixed with water such that the target molecules, such as perchlorate, selenium, sodium, or chloride are bound by the magnetic nanoparticles forming bound-nanoparticle complexes. Once the magnetic nanoparticles (or target binding molecules) have bound the target molecules, the bound-nanoparticle complexes are separated form the water using a magnetic field.

Rare earth magnets and/or electromagnets provided the magnetic field used for extracting bound-nanoparticle complexes (as well as any unbound magnetic nanoparticles).

A known concentration of aqueous solution with ion such as sodium, chloride, or selenate was mixed with a known mass of superparamagnetic iron-oxide nanoparticles conjugated to receptor, surface functionalized with PAA or PEG, or bare. The mixture solution was allowed to equilibrate for greater than 40 minutes. The magnetic nanoparticles were decanted by a permanent magnet leaving a purified solution. The ion concentration of the clear eluted solution was measured using a calibrated Ion-Selective electrode, conductivity meter, mass spectroscopy, ion chromatography, and EPA 200.8 method for selenate detection. The binding capacities were determined based on the following equations:

1. $[\text{ion}]b = [\text{ion}]\text{initial} - [\text{ion}]\text{final}$

2. $BC = \frac{[\text{salt ion}]_b}{C_d}$ where [ion] initial and [ion] final are the initial and final makeup water concentration (mg/L) of ions in aqueous solution. Cd is the concentration of nanoparticles in solution (g/L). BC is the binding capacity of milligram of ion bound per each gram of nanoparticle in solution.

The re-usability of the receptor conjugated, surface functionalized, and bare magnetic nanoparticles were assessed by desorption of the bound ion from the respective nanoparticles by washing the particles with sodium hydroxide, hydrochloric acid, or nitric acid for 1 to 15 minutes. The nanoparticles were recovered by magnetically decanting and further washed with deionized water using a similar process. The regenerated nanoparticles were reused for ion binding. 0.2 M NaOH and/or HCl was used for desorption of chloride and sodium from chloride binding receptor conjugated nanoparticles and PAA surface functionalized nanoparticles, respectively.

The chloride binding capacities of functionalized magnetic nanoparticles was in the range of about 62 to 66 mg/g and regenerated functional nanoparticles had a similar binding capacity showing the successful re-usability of the functionalized magnetic nanoparticles (FIG. 9). Such binding capacity of functionalized nanoparticles is comparable to ion-exchange resins for chloride removal from wastewater.

The sequential removal of chloride from an initial concentration of 1000 mg/L to a final concentration of 0.01 mg/L was accomplished with six sequential experimental runs using 30 mg of nanoparticles functionalized with chloride receptor (FIG. 10). Experimental runs of 10 mL each comprised of DI water with NaCl were used. Binding capacity was about 62 mg of chloride per gram of nanoparticle material and lessened with later runs due to very small concentrations of chloride (FIG. 11). Efficiency was low at around about 23% in the first run and increases due to the ratio of nanoparticles to concentration of chloride ions (FIG. 12). Capacity and efficiency was expected to be higher with larger concentration and quantity.

EXAMPLE 6

Selenate Removal Using Surface Functionalized and Bare Iron Oxide Nanoparticles

First Stage 15 mg of PEG-OH surface functionalized iron oxide nanoparticles were added to a 15 ml conical vial. 5 ml of 234.6 µg/L $Na_2SeO_4$ was added to vial and the material in the vial was allowed to equilibrate over 72 hours.

The 15 ml vial was placed on magnet to pull down particles. 3 ml of the solution was removed and placed in a "new" 15 ml conical vial. This "new" vial was placed on a permanent magnet with a field strength of 6485 gauss until the particles were pulled down, approximately 5 minutes. 1 ml of the solution from this "new" vial was added to 45 ml of deionized $H_2O$ in a 50 ml conical vial.

Second Stage

The original vial contained residual selenate solution. This residual selenate solution was removed by adding a dilute solution of NaOH (prepared by adding 0.015 g NaOH to 45 ml of deionized $H_2O$) to the PEG-OH functionalized nanoparticles, followed by three washes with deionized $H_2O$. 2 µl of the NaOH solution prepared as above was added to 5 ml of deionized $H_2O$. This amounts to a similar amount of NaOH by mass as selenium ions bound to particles.

5 ml of the 234.6 µg/L $Na_2SeO_4$ solution was added to the washed PEG-OH functionalized nanoparticles and allowed to equilibrate for 72 hours. The 15 ml conical vial was placed on a permanent magnet with a field strength of 6485 gauss to pull out the particles. 3 ml of the selenate solution was removed and placed in "new" 15 ml conical vial. This "new" vial was placed on the magnet to pull down the particles in about 5 minutes. 1 ml of selenate solution was removed and placed in 45 ml of deionized $H_2O$ in a 50 ml conical vial.

The concentration of selenium in the treated samples was analyzed by the standard method, EPA 200.8, using ICP-MS. The detection limit of the apparatus was 0.0004 mg/L (ppm).

EXAMPLE 7

Synthesis of Surface Functionalized Iron Oxide Nanoparticles Using Coprecipitation Synthesis Galactose functionalized iron oxide nanoparticles, Dextran/galactose functionalized iron oxide nanoparticles with 0.2:1 and 2:1 ratios respectively, and bare iron oxide nanoparticles without surface functionalization or stabilizers were prepared.

4.4 ml of $FeCl_2/FeCl_3$ was added via plastic pipette to a 50 ml conical containing 40 ml of 1M $NH_4OH$ and requisite stabilizer (Galactose, Dextran/Galactose). No stabilizer was used in preparing the bare iron oxide nanoparticles.

The $FeCl_2/FeCl_3$ ratio by mass was 1:2.8

| Material | FeCl2/FeCl3 (ml) | Dextran (g) | Galactose (g) |
|---|---|---|---|
| FeO - Galactose | 4.4 | 0 | 0.406 |
| FeO 0.2:1 Dex:Gala | 4.4 | 0.396 | 2.002 |
| FeO 2:1 Dex:Gala | 4.4 | 4 | 1.999 |
| Bare FeO | 4.4 | 0 | 0 |

The material was placed on shaker for approximately 1 hr. The temperature ranged from ambient to 37° C.

The materials were centrifuged at 5000 rpm for 5 minutes. The supernatant was poured off and the material washed with deionized H$_2$O. This was done 4 times. Small amounts of material were transferred to cyro-tubes to be dried on "quick dry—rotavap."

Example 8 Selenate removal using surface functionalized and bare iron oxide nanoparticles 15 mg (+/−3 mg) of the various surface functionalized and bare iron oxide nanoparticles was added to a 15 ml conical vial. 3 ml of 782 μg/L Na$_2$SeO$_4$ added to vial. The material was vortexed/sonicated and placed on a shaker overnight.

The 15 ml conical vial was placed on a permanent magnet with a field strength of 6485 gauss positioned beneath the vial until the particles were pulled down, about 5 minutes. 2 ml of the solution was removed and placed in "new" 15 ml conical vial. This "new" vial was placed on magnet until the particles were pulled down. 1 ml of the solution from the "new" conical vial was placed in 45 ml deionized H$_2$O in a 50 ml conical vial.

The concentration of selenium in the treated samples was analyzed by the standard method, EPA 200.8, using ICP-MS. The detection limit of the apparatus was 0.0004 mg/L (ppm).

The results are shown in FIGS. 24-28.

Throughout the specification, any and all references to publicly available documents are specifically incorporated by reference. It will be apparent to those skilled in the art that various modifications and variations can be made in the methods and corresponding nanoparticles and receptors without departing from the spirit and scope of the invention. Thus, it is intended to cover the modifications and variations of this invention and the above examples. The examples provided are embodiments of the present invention and in no manner limit or narrow the scope of the invention.

The invention claimed is:

1. A method of removing a target moiety from a liquid containing such target moieties comprising combining a quantity of magnetic nanoparticles with the liquid or the liquid with a quantity of magnetic nanoparticles, allowing the magnetic nanoparticles to form a complex with the target moieties, subjecting the liquid containing the nanoparticle-target complexes to a magnetic field such that the nanoparticle-target complexes segregate to a portion of the liquid, and separating the liquid into a first portion not containing the nanoparticle-target complexes and a second portion containing the nanoparticle-target complexes;

wherein the nanoparticles have a diameter within the range of from 1 nm to 500 nm.

2. The method of claim 1 where the first portion of the liquid not containing the nanoparticle complexes is recycled through the process of claim 1 one or more times.

3. The method of claim 1 where the liquid contains water.

4. The method of claim 1 where the target moiety contains selenium or a selenium containing compound.

5. The method of claim 1 where the target is desorbed from the magnetic nanoparticle-target complexes by washing the magnetic nanoparticle-target complexes with basic or acidic solutions.

6. The method of claim 1 where the magnetic nanoparticles are functionalized with the group consisting of dextran, a sugar, polyethylene glycol, hydroxyl modified polyethylene glycol, modified poly alkylene glycols, polyvinyl alcohol, gold, azide, carboxyl groups, activated carbon, zeolites, amines, poly acrylic acid, charged polymers, polyether, polyalkylene glycol, crown ether, poly acrylic acid, macrocycle, and combinations thereof.

7. The method of claim 1, further comprising desorbing the target moiety from the magnetic nanoparticle-target complexes by washing the magnetic nanoparticle-target complexes.

8. A method of segregating target moieties contained in a liquid into a portion of the liquid comprising combining a quantity of magnetic nanoparticles with the liquid or the liquid with a quantity of magnetic nanoparticles, allowing the magnetic nanoparticles to form a complex with the target moieties, subjecting the liquid to a magnetic field such that the nanoparticle-target complexes segregate to a portion of the liquid;

wherein the nanoparticles have a diameter within the range of from 1 nm to 500 nm.

9. The method of claim 8, further comprising desorbing the target moiety from the magnetic nanoparticle-target complexes by washing the magnetic nanoparticle-target complexes.

* * * * *